(12) United States Patent
Mehta et al.

(10) Patent No.: US 9,231,871 B2
(45) Date of Patent: Jan. 5, 2016

(54) FLOW DISTRIBUTION TABLE FOR PACKET FLOW LOAD BALANCING

(71) Applicant: Versa Networks, Inc., Santa Clara, CA (US)

(72) Inventors: Apurva Mehta, Cupertino, CA (US); Shivaprakash Shenoy, Los Altos, CA (US); Kumar B. Mehta, Cupertino, CA (US); Manjunath Madhava Prabhu, Santa Clara, CA (US); Randhir Bhattacharya, Bangalore (IN); Srinivasa Chaganti, Santa Clara, CA (US)

(73) Assignee: Versa Networks, Inc., Santa Clara, CA (US)

( * ) Notice: Subject to any disclaimer, the term of this patent is extended or adjusted under 35 U.S.C. 154(b) by 113 days.

(21) Appl. No.: 14/089,710

(22) Filed: Nov. 25, 2013

(65) Prior Publication Data

US 2015/0146539 A1 May 28, 2015

(51) Int. Cl.
*H04L 12/28* (2006.01)
*H04L 12/803* (2013.01)

(52) U.S. Cl.
CPC .................................. *H04L 47/125* (2013.01)

(58) Field of Classification Search
None
See application file for complete search history.

(56) References Cited

U.S. PATENT DOCUMENTS

| 8,908,521 | B2* | 12/2014 | Dyke | .................. | H04L 67/1002 |
| | | | | | 370/235 |
| 9,088,584 | B2* | 7/2015 | Feng | .................... | H04L 67/1031 |
| 2014/0098662 | A1* | 4/2014 | Jungck | .............. | H04L 29/12066 |
| | | | | | 370/230 |
| 2014/0301213 | A1* | 10/2014 | Khanal | ................... | H04L 43/12 |
| | | | | | 370/248 |

* cited by examiner

*Primary Examiner* — Frank Duong
(74) *Attorney, Agent, or Firm* — Shumaker & Sieffert, P.A.

(57) ABSTRACT

In general, techniques for implementing a flow distribution service using a plurality of traffic nodes that may operate as processing nodes of a distributed computing system are described. In some examples, the traffic nodes in the aggregate form a virtual appliance configured to apply a network service to packet flows.

23 Claims, 11 Drawing Sheets

FLOW DISTRIBUTION TABLE FOR PACKET FLOW LOAD BALANCING

TECHNICAL FIELD

The disclosure relates to computer networks and, more specifically, to packet flow load balancing.

BACKGROUND

Distributed computing systems are made up of multiple interconnected processing nodes that cooperate to apply a common service to tasks. For distributed computing systems configured to implement a network service such as firewall or other virtual security service, load balancing, wide area network (WAN) optimization, Quality of Service (QoS), and network analysis and monitoring, for instance, each of the processing nodes may apply the network service to one or more packet flows that are associated in some manner to the processing node so that the processing node can consistently service the packet flow(s). Because a packet flow consists of multiple packets transmitted over time, the processing node that applies a network service to the packet flow should be associated to the packet flow for its duration, and each access node in the distributed computing system should consistently route the packets for the packet flow to the associated processing node.

SUMMARY

In general, techniques for implementing a flow distribution service using a plurality of traffic nodes that may operate as processing nodes of a distributed computing system are described. In some examples, the traffic nodes in the aggregate form a virtual appliance configured to apply a network service to packet flows.

In some example implementations, the traffic nodes implement a dynamic flow distribution table (FDT) that enables a lookup service by which any of the traffic nodes can determine the traffic node that services a particular packet flow. The FDT is a data structure by which the traffic nodes manage a key space and includes table entries that each specifies a different range of the key space. Each table entry from the table entries also specifies a single traffic node from the traffic nodes, which may be referred to as the "owner" of packet flows that match the range of the key space that is specified by the table entry. A table entry of the FDT thus represents an association between a range of the key space and a traffic node, which accordingly "owns" the range. As the traffic nodes receive a packet for a packet flow, the traffic nodes map the packet to a key (the "flow key" of the packet) in the key space and determine the table entry of the FDT and, by extension, the owner traffic node that is associated with the range of the key space that includes the flow key. The traffic nodes then forward, if necessary, the packet to the owner traffic node, which applies the network service to the packet.

The traffic nodes redistribute ranges of the key space to balance flow utilization of each of the traffic nodes according to capacity and load considerations, as well as increases/reductions in the number of traffic nodes of the system. For instance, a traffic node experiencing high and potentially unsustainable utilization (the "source traffic node") may migrate a portion of its owned key space, represented by a range of the overall key space, to another traffic node (the "target traffic node") such that the target traffic node owns and is therefore responsible for applying the service to packet flows that map to the migrated range. During the steady state for the FDT (i.e., no traffic node is currently in a process of migrating any of its owned key space), each of the traffic nodes store identical FDTs.

However, in some instances, the source traffic node that migrates a range of its owned key space may be currently applying the service to an active flow that maps to a flow key within the migrated range. In such instances, the source traffic node may additionally advertise an "exact match" FDT table entry, which uniquely matches the active flow, to the target traffic node as an exception to the migrated range. The exact match FDT table directs the target node to continue forwarding packets for the active flow to the source traffic node and is operative on the target traffic node for the duration of the active flow.

The techniques applied by the traffic nodes for implementing the FDT may provide one or more advantages. For example, the techniques may provide for a scalable virtual appliance for applying services to packet flows in that the FDT, as implemented by the traffic nodes according to the described techniques, may permit an increase or decrease in the number of available traffic nodes without requiring manual reconfiguration of the owner traffic nodes for key ranges. For instance, although a traffic node may fail and relinquish its ability to apply the service to packet flows mapped to its owned range, the key range migration techniques may allow other traffic nodes of the system to assume the range previously owned by the failed traffic node without intervention by an administrator and without loss of flows except to those flows being processed by the failed node at the time of failure (in cases of no redundancy).

As another example, the techniques may provide for an extensible application of the service to packet flows by the individual traffic nodes. By permitting key range migration, the techniques may allow the ownership of key ranges according to variant and dynamic traffic node capacity and utilization considerations. In addition, the techniques are operative without regard to the load balancing implementation of the upstream router. That is, regardless of the entry point into the system, a traffic node that receives a packet has access to the identical FDT stored by each of the traffic nodes and can forward the packet to the appropriate owner traffic node of the flow key to which the packet maps. The techniques may also be applicable in multiple computing environments, e.g., both physical and virtual.

The techniques may also provide for efficient processing of packet flows, for the techniques may reduce and in many cases prevent entirely the loss of traffic or stale packet flow processing sessions by enabling redistribution of key ranges and the attendant processing load from overloaded traffic nodes. Further, the techniques limit the number of hops taken by a packet among the traffic nodes. At most, the traffic nodes will forward a packet from a packet flow that matches an exact match FDT entry twice. The traffic nodes forward all other packets at most once (in the steady state).

In one aspect, a method includes storing, by a source traffic node of a plurality of traffic nodes that are configured as a distributed computing system to apply a service to packet flows received by any of the plurality of traffic nodes, a flow distribution table comprising a plurality of flow distribution table entries that each associates a corresponding flow key range from a plurality of flow key ranges with an owner traffic node of the plurality of traffic nodes for the corresponding flow key range, wherein each of the plurality of flow key ranges comprises a contiguous range of flow key values, wherein an existing flow distribution table entry of the flow distribution table entries associates an existing flow key range with the source traffic node. The method also includes generating, by the source traffic node, a new flow distribution table entry that associates a new flow key range with a target traffic node of the plurality of traffic nodes, wherein the new flow key range is a sub-range of the existing flow key range. The method also includes receiving, by the source traffic node, an initial packet of a packet flow of the packet flows, matching the initial packet to the new flow key range of the new flow distribution table entry, and forwarding the initial packet of the packet flow to the target traffic node based at least on the new flow distribution table entry that associates the new flow key range with the target traffic node.

In another aspect, a method includes by a controller for a plurality of traffic nodes that are configured as a distributed computing system to apply a service to packet flows received by any of the plurality of traffic nodes, receiving a resource utilization report from a source traffic node of the plurality of traffic nodes, wherein the source traffic node of the plurality of traffic nodes stores a flow distribution table comprising a plurality of flow distribution table entries that each associates a corresponding flow key range of a plurality of flow key ranges with an owner traffic node of the plurality of traffic nodes for the corresponding flow key range, wherein each of the plurality of flow key ranges comprises a contiguous range of flow key values. The method also includes sending, by the controller in response to the resource utilization report and to the source traffic node, a rebalance notification message that directs source traffic node to migrate at least one flow key range of the plurality of flow key ranges. The method also includes receiving, by the controller from the source traffic node, a range migration update message that indicates the source traffic node is ready to migrate ownership of a flow key range for migration to a target traffic node of the plurality of traffic nodes. The method also includes broadcasting, by the controller to the plurality of traffic nodes, a range migration broadcast message that indicates the target traffic node is an owner traffic node of the flow key range for migration.

In another aspect, a plurality of traffic nodes that are configured as a distributed computing system to apply a service to packet flows received by any of the plurality of traffic nodes, wherein the plurality of traffic nodes includes a source traffic node and a target traffic node, wherein the source traffic node includes a control unit having a processor and a computer-readable storage medium configured to store a flow distribution table comprising a plurality of flow distribution table entries that each associates a corresponding flow key range from a plurality of flow key ranges with an owner traffic node of the plurality of traffic nodes for the corresponding flow key range, wherein each of the plurality of flow key ranges comprises a contiguous range of flow key values, wherein an existing flow distribution table entry of the flow distribution table entries associates an existing flow key range with the source traffic node. The source traffic node also includes a distribution manager executed by the control unit and configured to generate a new flow distribution table entry that associates a new flow key range with the target traffic node, wherein the new flow key range is a sub-range of the existing flow key range. The source traffic node also includes a flow router executed by the control unit and configured to receive an initial packet of a packet flow from the packet flows, match the initial packet to the new flow key range of the new flow distribution table entry, and forward the initial packet of the packet flow to the target traffic node based at least on the new flow distribution table entry that associates the new flow key range with the target traffic node.

In another aspect, a controller device for a plurality of traffic nodes that are configured as a distributed computing system to apply a service to packet flows received by any of the plurality of traffic nodes includes a processor configured to receive a resource utilization report from a source traffic node of the plurality of traffic nodes, wherein the source traffic node of the plurality of traffic nodes stores a flow distribution table comprising a plurality of flow distribution table entries that each associates a corresponding flow key range of a plurality of flow key ranges with an owner traffic node of the plurality of traffic nodes for the corresponding flow key range, wherein each of the plurality of flow key ranges comprises a contiguous range of flow key values. The processor is further configured to send, in response to the resource utilization report and to the source traffic node, a rebalance notification message that directs source traffic node to migrate at least one flow key range of the plurality of flow key ranges. The processor is further configured to receive, from the source traffic node, a range migration update message that indicates the source traffic node is ready to migrate ownership of a flow key range for migration to a target traffic node of the plurality of traffic nodes. The processor is further configured to broadcast, to the plurality of traffic nodes, a range migration broadcast message that indicates the target traffic node is an owner traffic node of the flow key range for migration.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1A:
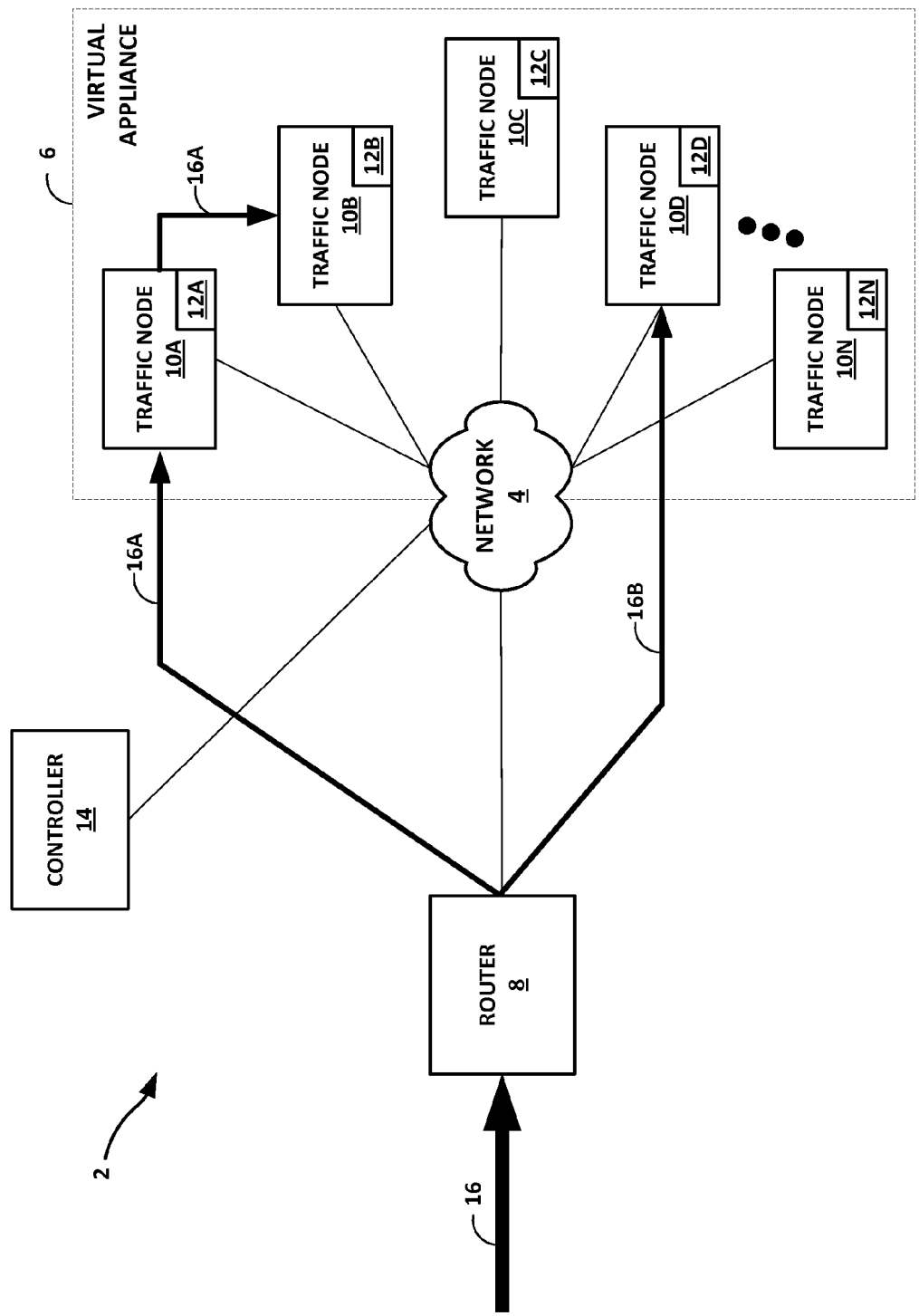
FIGS. 1A-1B are block diagrams illustrating a network system in which multiple traffic nodes implement a flow distribution service to distribute packet flows among the traffic nodes according to techniques described herein.
Figure 1B:
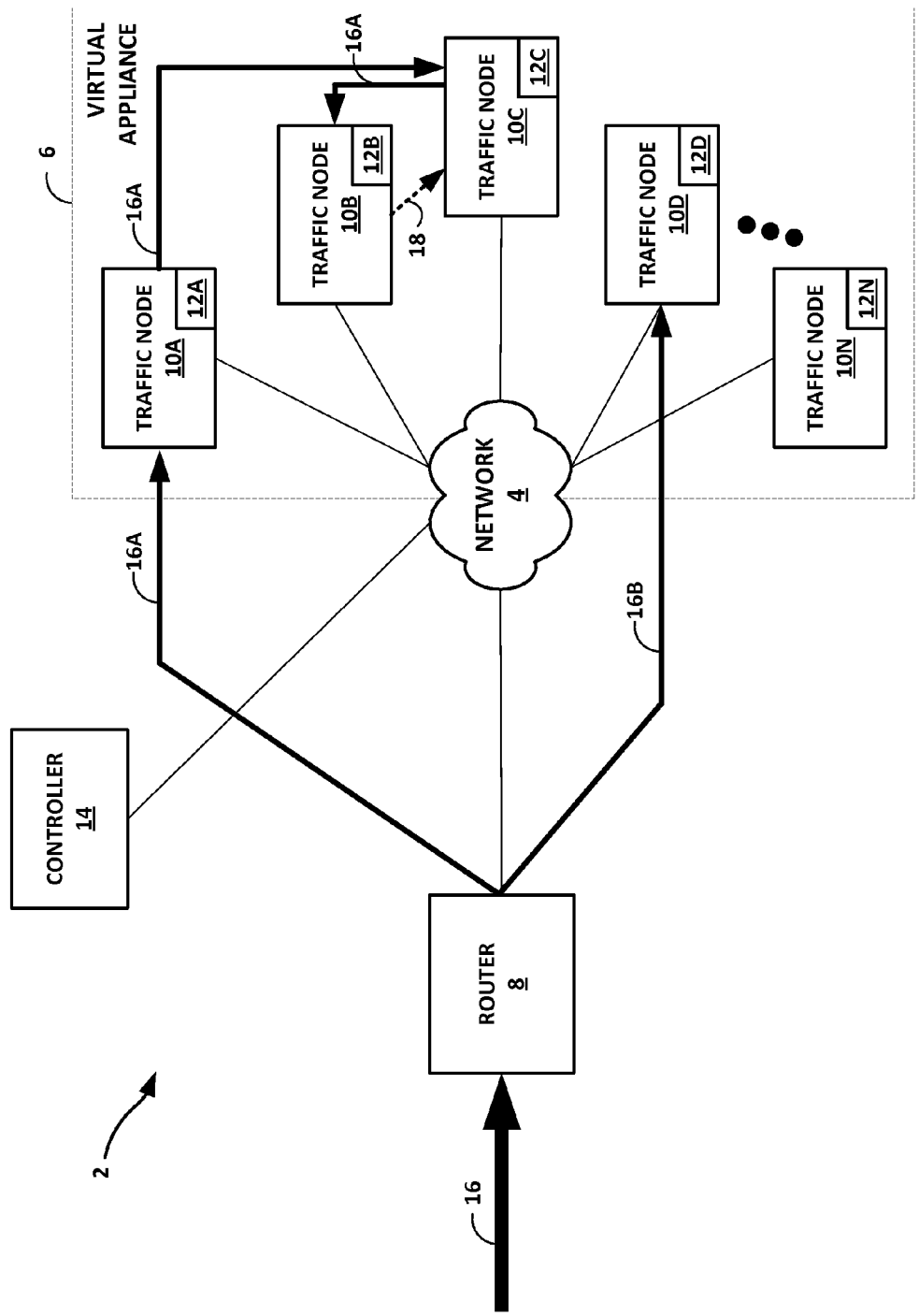

FIGS. 1A-1B are block diagrams illustrating a network system 2 in which multiple traffic nodes implement a flow distribution service to distribute packet flows 16 among the traffic nodes according to techniques described herein. In the example of FIGS. 1A-1B, network system 2 includes a plurality of traffic nodes 10A-10N (collectively, "traffic nodes 10"), a router 8, and a controller 14 communicatively coupled by a network 4. The network 4 may represent a layer 3 (L3) network by which the traffic nodes 10, router 8, and controller 14 exchange L3 packets. Communication links of network 4 couple traffic nodes 10 to one another and to controller 14 and router 8. The term "communication link," as used herein, comprises any form of transport medium, wired or wireless, and can include intermediate nodes such as network devices.

Each traffic node from traffic nodes 10 applies a service to packet flows 16 or, alternatively, relays packet flows to a server or appliance uniquely associated with the traffic node in order to apply the service to packet flows 16. In some instances, the service applied by traffic nodes 10 is an end-user or subscriber service, such as Voice-over-Internet Protocol (VoIP), content delivery, video and multimedia services, data collection, and security services, for example. In some instances the service applied by traffic nodes 10 is a carrier-edge or network service such as firewall, carrier grade network address translation (CG-NAT), media optimization, IPSec/VPN, subscriber management, policy enforcement, Traffic Detection Function (TDF), and load balancing of packet flows 16 among one or more servers that provide an end-user service. In such examples, traffic nodes 10 form a virtual appliance configured to apply the service to received packet flows (as illustrated in FIGS. 1A-1B). Traffic nodes 10 may apply multiple services to the packet flows 16.

Each of traffic nodes 10 may represent a separate physical computing device, also referred to as "real servers." Alternatively, or in addition, some or all of traffic nodes 10 may represent processes executed by different virtual machines executing on real servers. In some instances, one or more of traffic nodes 10 may each represent multiple servers, e.g., a server farm or cluster of a service complex provided by network system 2. Each of traffic nodes 10 may present an independent interface accessible to packets. For example, each of traffic nodes 10 may be assigned a different network (IP) address that is addressable by router 8. As another example, traffic nodes 10 may be respectively identifiable according to a label switched path (LSP), pseudowire (PW), or other tunneling protocol tunnel identifier that router 8 may use to forward traffic to an identified one of traffic nodes 10. Traffic nodes 10 may be part of a data center, service complex, and/or enterprise. In some examples, router 8 may be located at or otherwise integrated within one or more devices of the data center or service complex.

In some examples, traffic nodes 10 are inline for packet flows traversing a core network from an access network, which are both operated by a service provider to provide connectivity access for subscriber devices to a packet data network (PDN) and to apply carrier services to packet flows associated with the subscriber devices. In such examples, router 8 may represent a mobile gateway such as a PDN gateway (PGW) and/or General Packet Radio Service (GPRS) Gateway Serving Node (GGSN), or a gateway for a broadband/wireline network such as a Broadband Services Router (BSR), Broadband Network Gateway (BNG), business provider edge (PE) router, and/or a Broadband Remote Access Server (BRAS). Network 4 may represent a portion of a Gi/SGi network and may alternatively be referred to as an SGi-LAN and/or Gi-LAN.

In some instances, router 8 represents a Traffic Detection Function (TDF) device or other device that load balances packet flows 16 among the traffic nodes 10. In some instances, router 8 represents an access network gateway that load balances packet flows 16 among traffic nodes 10 that apply a TDF service. Virtual appliance 6 formed by traffic nodes 10 may represent an application delivery controller (ADC) or other virtual network device that manages application delivery with respect to application servers of, e.g., a data center. In some instances, virtual appliance 6 may represent a services delivery gateway (SDG) that manages delivery of services provided by separate physical or virtual devices accessible to traffic nodes 10.

Router 8 receives one or more packet flows 16 and distributes the packet flows among traffic nodes 10 according to a distribution or load-balancing scheme. The term "packet flow," "traffic flow," or simply "flow" as used herein refers to a set of packets originating from a particular source device and sent to a particular destination device as part of a communication session between the source and destination device. A flow of packets may be identified by the 5-tuple: <source network address, destination network address, source port, destination port, protocol> and in some cases by other information discernible using packets of the flow of packets, such as tunnel header fields (e.g., Tunnel Endpoint Identifiers (TEIDs) for GPRS Tunneling Protocol (GTP), Generic Route Encapsulation (GRE) header fields, IP-in-IP header fields, Label Switched Path (LSP) labels, service labels such as pseudowire labels, VLAN tags, VxLAN tags, and so forth). This additional information may in some instances be used in combination with an n-tuple to identify a flow packets. A 5-tuple generally identifies a packet flow 16 to which a received packet corresponds. An n-tuple or "n-IP-tuple" refers to any n items drawn from the 5-tuple. For example, the different combinations of <source network address, destination network address> and <source network address, source port> are example 2-tuples for a packet.

Router 8 may be configured with configuration information that enable forwarding of packets of the packet flows to traffic nodes 10 in accordance with the distribution scheme. The configuration information identifies the set of traffic nodes 10 by an identifier that may be, for instance, an IP address (IPv4/IPv6, e.g.), a tunnel identifier, a server farm identifier, or any other information that enables router 8 to forward packets to the identified traffic node 10. The distribution scheme may be, for example, a load balancing algorithm. Router 8 may apply Equal-Cost Multi-Path (ECMP) hashing to packet flows 16 to distribute the flows among traffic nodes 10.

In the illustrated example, router 8 that is upstream from traffic nodes 10 (i.e., flows 16 flow from router 8 toward traffic nodes 10) distributes packet flow 16A to traffic node 10A and traffic node 10D. Traffic nodes 10 may be unable to determine the traffic node 10 that is to receive any particular flow 16 distributed by router 8. In other words, the distribution scheme applied by router 8 to packet flows 16 may be transparent to traffic nodes 10. Accordingly, the application of the service by traffic nodes 10 may be independent of the distribution scheme applied by router 8 to packet flows 16.

In accordance with techniques described in this disclosure, each of traffic nodes 10 implements a corresponding one of Flow Distribution Table (FDT) instances 12A-12N (collectively, "FDTs 12") that enable a lookup service by which any of the traffic nodes 10 can determine the particular traffic node 10 that services a particular packet flow 16. In general, a traffic node 10 that applies the traffic nodes 10 service to a particular packet flow 16 is referred to as the "anchor traffic node" for that packet flow. For example, as described in further detail below, traffic node 10D is the "anchor traffic node" for (or in other words "anchors") packet flow 16B. By implementing FDTs 12, traffic nodes 10 can improve, and in some cases ensure, flow affinity of packet flows 16 to the appropriate anchoring traffic nodes 10 for the packet flows 16.

In some examples, each of traffic nodes 10 (or each of a subset of traffic nodes 10) includes one or more FDTs in addition to FDTs 12. The additional FDTs may be tenant and/or application specific. In other words, traffic nodes 10 may use additional FDTs for a different network service and/or may use additional FDTs to segregate the control data structure for distributed application of the network service according to different tenants of the virtual appliance 6. In this way, traffic nodes 10 may facilitate silo-ing of packet flows associated with the different tenants.

Each of FDTs 12 is a data structure by which the traffic nodes 10 manage a key space and includes table entries that each specifies a different range of the key space. The key space represents a continuous range of potential values into which various packets flows 16 may be mapped. The potential values are typically integers for computational efficiency. Thus, the key space may be defined by a continuous range of integers, e.g., the range of k-bit integers occupying the $0-(2^k-1)$ integer space, where k is an integer, e.g., k=20, k=24, or k=32. The different ranges of the key space specified by the table entries of the FDTs may overlap. That is, for any value within the key space, multiple table entries of the FDT 12 may specify a range of the key space that includes the value in the steady-state for FDTs 12. The matching table entry for the key, in such cases, is the table entry that has the smallest or narrowest range of the key space.

One example of a key space is a hashing function value space defined as the continuous range of possible values that result from applying the hashing function to inputs. Hashing function values may alternatively be referred to as "hash indexes" or "hash buckets." Example hashing functions include e.g., SHA-1, MD5, or a cyclic redundancy check such as CRC32 or CRC64.

Each table entry from the table entries for the FDTs 12 also specifies a single traffic node 10 from the traffic nodes 10, which may be alternatively referred to as the "owner" of the range of the key space that is specified by the table entry. A table entry of any of FDTs 12 thus represents an association between a range of the key space and a traffic node 10, which accordingly "owns" that range. When a receiving traffic node 10 receives a packet for any of packet flows 16, the traffic node 10 computes a key (the "flow key") in the key space for the packet and determines the table entry of its FDT 12 that specifies a range of the key space that include the flow key. Because the determined table entry specifies the owner traffic node 10, the receiving traffic node 10 forwards, if necessary, the packet to the owner traffic node 10, which applies the service to the packet. In some cases, the receiving traffic node 10 is also the owner traffic node 10, in which cases the receiving traffic node 10 does not need to forward the packet for service application.

As one illustrated example from FIG. 1A, router 8 directs the one or more packets that make up packet flow 16B to traffic node 10D, which computes a flow key for the packets as they are received. Flow distribution table 12D of traffic node 10D includes a table entry that specifies a key range that includes the flow key and that further specifies traffic node 10D as the owner of the key range. Accordingly, traffic node 10D applies the service to the packets of flow 16B.

As another illustrated example from FIG. 1A, router 8 directs the one or more packets that make up packet flow 16A to traffic node 10A, which computes a flow key for the packets as they are received. Flow distribution table 12A of traffic node 10A includes a table entry that specifies a key range that includes the flow key and that further specifies traffic node 10B as the owner of the key range. Traffic node 10A therefore forwards the packets to traffic node 10B, which applies the traffic nodes 10 service to the packets of flow 16A.

Controller 14 manages the distribution and redistribution (or "migration") of key ranges ownership among traffic nodes 10. For instance, controller 14 may manage the initial assignment and distribution of key ranges among traffic nodes 10. Controller 14 may consider the respective service processing capabilities of the various traffic nodes 10 in determining an initial distribution. To initially distribute the key ranges, controller 14 assigns initial key ranges to the traffic nodes 10 and sends a representation of the assignments to each of traffic nodes 10, which store the assignments as table entries of FDTs 12. FDTs 12 may therefore have identical table entries in the initially-assigned state of the system, with each table entry in the FDTs 12 specifying both a key range and the owner traffic node 10 to which the key range has been assigned by controller 14. Although the overall key space for flows 16 is contiguous, controller 14 may assign multiple key ranges that are noncontiguous to one or more of traffic nodes 10.

In some examples, controller 14 may include one of traffic nodes 10 and execute functionality described herein with respect any of traffic nodes 10. In some cases, controller 14 may not own a key range and therefore does not apply the service to packet flows. In such cases, however, controller 14 may nevertheless attract packet flows from router 8 and forward the packet flows in accordance with an instance of a flow distribute table for the traffic node 10 included in the controller 14. In some examples, the traffic node 10 included in controller 14 may own key ranges and process matching packet flows. Controller 14 may in some instances represent a process executed by a virtual machine.

The traffic nodes 10 in cooperation with controller 14 redistribute key ranges of the key space to balance flow utilization of each of the traffic nodes 10 according to capacity and load considerations, as well as increases/reductions in the number of traffic nodes 10 of the network system 2 in some cases. For instance, traffic node 10A experiencing high and potentially unsustainable utilization (the "source traffic node") may migrate a portion of its owned key space, represented by a key range of the overall key space, to another traffic node 10B (the "target traffic node") such that the target traffic node 10B now owns, and is therefore responsible for applying the service to, packet flows 16 that map to the migrated key range. As another example, an administrator and/or network controller, such as controller 14 or another device operating as a virtual machine orchestration device, may add one or more additional traffic nodes 10 to network system 2 by adding new real servers or spawning additional virtual machines that execute processes that implement the functionality of traffic nodes 10. Traffic nodes 10 (or some strict subset thereof) in cooperation with controller 14 may each therefore migrate a portion of their respective key ranges to the additional traffic nodes 10. As noted above, during the steady state for FDT 12 (i.e., no traffic node 10 is currently in a process of migrating any of its owned key space), each of the traffic nodes store identical, respective FDTs 12. During migration of one or more key ranges, however, FDTs 12 may vary.

In some instances, a source traffic node 10 that migrates one of its owned key ranges may be currently applying the service to an active flow 16 that maps to a flow key that matches the migrated range. In such instances, the source traffic node 10 may additionally advertise an "exact match table entry" for FDT 12, which uniquely matches active flow 16, to the target traffic node 10 as an exception to the migrated range. The exact match FDT table directs the target traffic node 10 to continue forwarding of packets for the active flow 16 to the source traffic node 10 and is operative on the target traffic node for the duration of the active flow 16. In some instances, traffic nodes 10 store exact match table entries to a table or other data structure separate from FDT 12.

For example, FIG. 1B illustrates advertisement of an exact match table entry and attendant packet forwarding. FIG. 1B represents a migration state subsequent to the steady state illustrated in FIG. 1A. In particular, a source traffic node 10B has migrated, in cooperation with controller 14, a key range that is a portion of its overall key range (i.e., the collection of one or more key ranges owned by traffic node 10B) to a destination traffic node 10C such that destination traffic node 10C now owns the migrated key range. This migration is represented in FDT 12A, i.e., a flow table entry of FDT 12A specifies the migrated key range and further specifies traffic node 10C as the owner thereof.

The migrated key range encompasses the flow key for packet flow 16A, which is an active flow already in process of being serviced by traffic node 10B (as illustrated in FIG. 1A). (Again, traffic nodes 10 may apply the service to packets themselves or apply the service by forwarding packets to an associated service device). Because packet flow 16A is active, traffic node 10B advertises, to traffic node 10C using exact match message 18 (either directly or indirectly via controller 14), an exact match table entry that associates packet flow 16A with traffic node 10B.

Traffic node 10A subsequently receives packets of packet flow 16 and computes the flow key for the packets, which is included in the migrated key range represented in updated FDTs 12A and associated with traffic node 10C. Traffic node 10A therefore forwards the received packets of packet flow 16 to traffic node 10C. Rather than service the packets, however, traffic node 10C matches the packet of flow 16A (i.e., packet field values of the packets) to the exact match table entry received in exact match message 18. Because the exact match table entry associates flow 16A to source traffic node 10B that is currently servicing flow 16A, traffic node 10C redirects the packets of flow 16A to traffic node 10B, which applies the service.

The techniques applied by the traffic nodes 10 for implementing the lookup service using FDTs 12 may provide one or more advantages. For example, the techniques may provide for a scalable virtual appliance 6 for applying services to packet flows 16 in that the FDTs 12, as implemented by the traffic nodes 10 according to the described techniques, may permit an increase or decrease in the number of available traffic nodes 10 without requiring manual reconfiguration. For instance, although a traffic node 10 may fail and relinquish its ability to apply the service to packet flows 16 mapped to its owned range, the key range migration techniques may allow other traffic nodes 10 of network system 2 to assume the range previously owned by the failed traffic node 10 without intervention by an administrator and without loss of flows except to those flows being processed by the failed node at the time of failure (in cases of no traffic node redundancy).

As another example, the techniques may provide for an extensible application of the service to packet flows 16 by the individual traffic nodes 10. By permitting key range migration, the techniques may allow the ownership of key ranges according to variant and dynamic traffic node 10 capacity and utilization considerations. In addition, as noted above, the techniques are operative without regard to the load balancing implementation of the upstream router 8. That is, regardless of the entry point into virtual appliance 6, a traffic node 10 that receives a packet has access to the identical FDTs 12 (in the steady state) and can forward the packet to the appropriate owner traffic node 10 of the flow key for the packet. The techniques may also be applicable in multiple computing environments, e.g., both physical and virtual.

The techniques may also provide for efficient processing of packet flows 16, for the techniques may reduce and in many cases prevent entirely the loss of traffic or stale packet flow processing sessions by enabling redistribution of key ranges and the attendant processing load from overloaded traffic nodes. Further, the techniques limit the number of hops taken by a packet among the traffic nodes 10. At most, the traffic nodes 10 will forward a packet that matches an exact match table entry twice. The traffic nodes 10 forward all other packets (i.e., packets that do not match an exact match table entry) at most once.

Figure 2A:
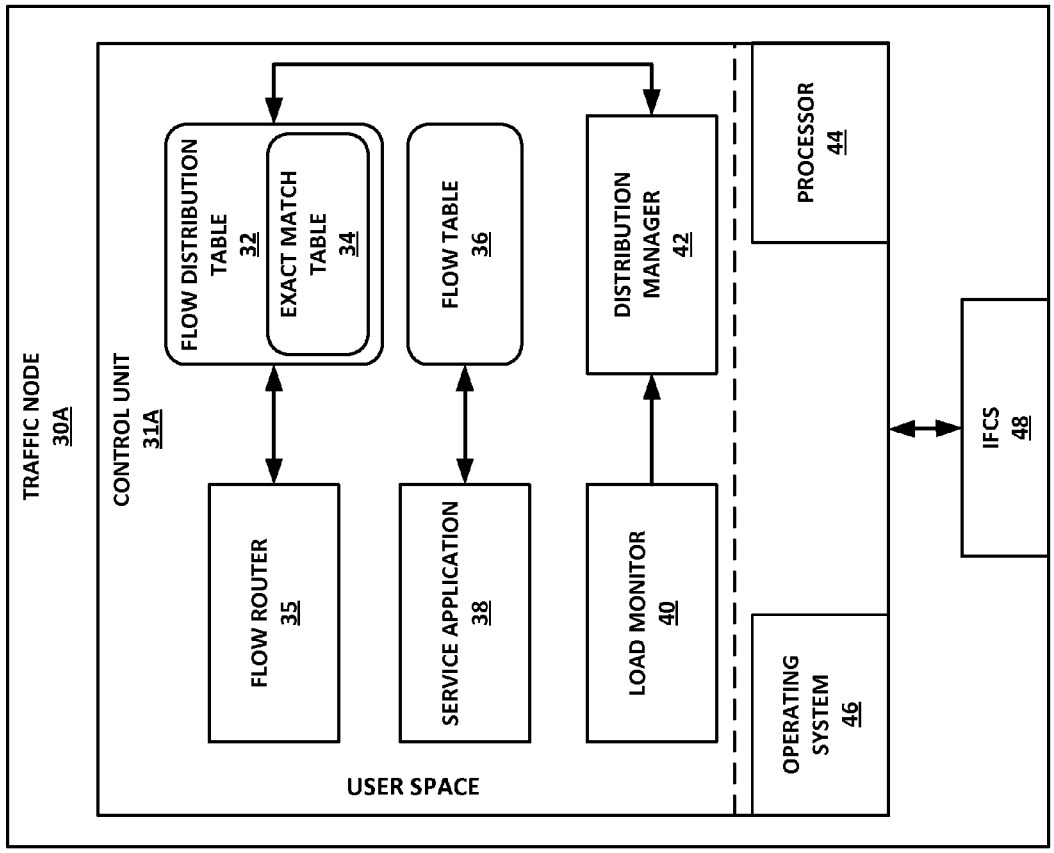
FIGS. 2A-2B are block diagrams illustrating example instances of a traffic node that implement flow distribution techniques described in this disclosure.
Figure 2B:
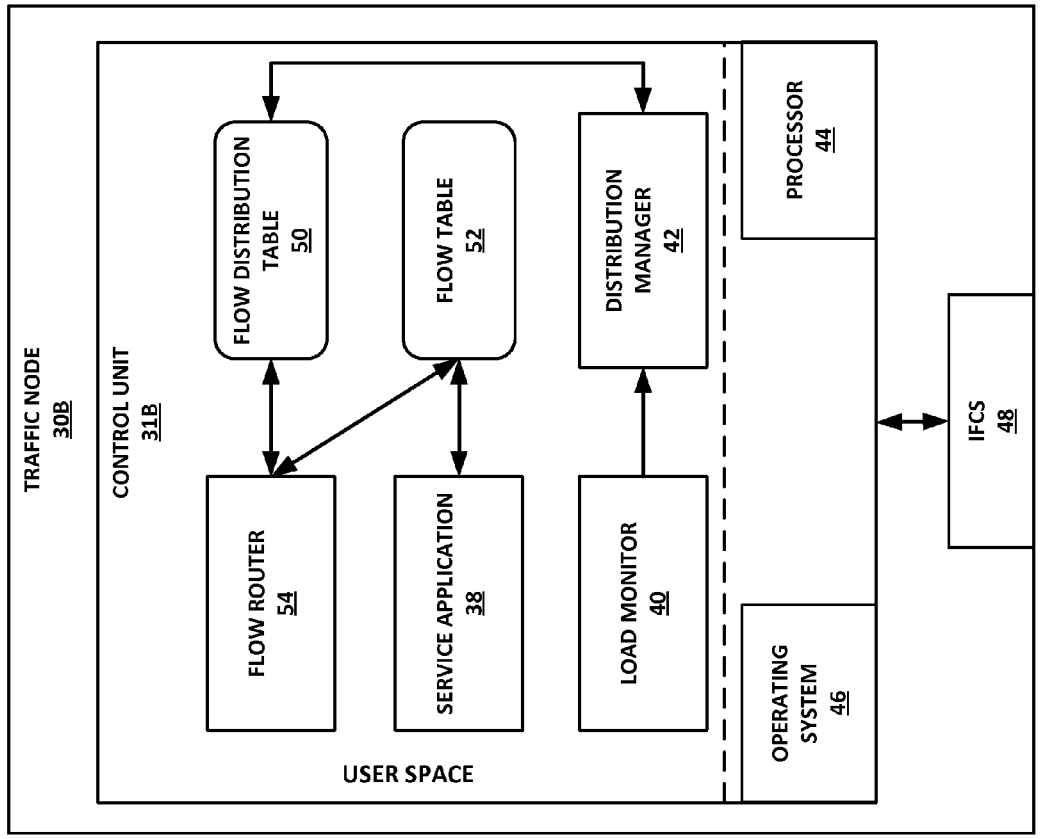

FIGS. 2A-2B are block diagrams illustrating different examples of a traffic node that implements flow distribution techniques described in this disclosure. Traffic nodes 30A-30B illustrated in FIGS. 2A-2B may represent example instances of any of traffic nodes 10 of FIGS. 1A-1B, 3, and 5-9 in further detail.

In the example of FIG. 2A, control unit 31A includes a combination of hardware and software that provides an operating environment for execution of one or more modules executing in user space, including flow router 35, service application 38, load monitor 40, and distribution manager 42. Control unit 31B of FIG. 2B includes a combination of hardware and software that provides an operating environment for execution of one or more modules executing in user space, including flow router 54, service application 38, load monitor 40, and distribution manager 42. The modules may be executed by user-level processes (not shown) managed by operating system 46, which provides a run-time environment for the user-level processes. Operating system 46 may represent, for example, a UNIX operating system derivative such as Linux or Berkeley Software Distribution (BSD). Operating system 46 offers libraries and drivers by which user-level processes executing the above module may interact with the underlying system. The hardware environments of control units 31A-31B include processor 44 that executes program instructions loaded into a main memory (not shown in FIGS. 2A-2B) from a storage device (also not shown in FIGS. 2A-2B) in order to execute the software stack, including both operating system 46 and user-level processes of control units 31A-31B. Processor 44 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In some examples, the user-level processes that implement the functionality of traffic nodes 30A-30B execute over a runtime environment that includes a virtual machine presented by operating system 46. Some aspects of control units 31A-31B may support multiple instances of a traffic node. For example, multiple traffic nodes may operate in separate process virtual machines to insulate the user processes from one another. That is, in such embodiments, each of the traffic nodes operates in a separate instance of a virtual machine. Some aspects of control units 31A-31B may implement a system virtual machine that provides a virtual architecture over the hardware environment.

Each of IFCs 48 coupled to any of control units 31A-31B may include interfaces for various combinations of layer two (L2) technologies, including Ethernet, Gigabit Ethernet (GigE), and Synchronous Optical Networking (SONET) interfaces. IFCs 48 provide received L2 PDUs, or at least the payloads thereof, to control units 31A-31B for processing. Likewise, control units 31A-31B outputs L2 PDUs for transmission via IFCs 48 interfaces. Various examples of traffic nodes 30A-30B may include more or fewer IFCs. In some examples, traffic nodes 30A-30B include a distributed forwarding architecture having multiple forwarding components (not shown) each associated with different IFCs and connected by a switch fabric (also not shown). The switch fabric connecting the forwarding units to one another provides a high-speed interconnect for forwarding incoming transit network packets to the selected one of forwarding units for output over one of IFCs 48 network interface.

Control unit 31A of FIG. 2A executes flow router 35, service application 38, load monitor 40, and distribution manager 42 to implement a flow distribution table lookup service according to techniques described herein. Flow distribution table (FDT) 32 stored to a computer-readable storage medium of control unit 31 maps key ranges of a packet flow key space to instances of traffic node 30A. Flow distribution table 32 is an associative data structure having one or more table entries (or tree/trie nodes that are also referred to herein as "table entries") that each associate a different key range with a traffic node. Each table entry for a key range may also include a data structure to record a history of flows having flow keys that match the key range. The data structure may be, for instance, a counter that increments upon each new flow mapped to the key range or a list structure that includes records specifying flow keys that match the key range and the respective number of flows (if any) mapped to the flow keys. Flow distribution table 32 may be implemented using a table, tree/trie, or a combination thereof.

In some instances, flow key ranges of the packet flow key space may be expressed in dot-decimal notation, a notation also commonly used to represent IPv4/IPv6 routes. Use of dot-decimal notation allow for the compact representation of key prefixes using masks similar to Classless Inter-Domain Routing (CIDR) masks (e.g., /20, /24) to denote the size of a key range defined by a key value and the prefix size. While a similar notation is commonly used for IP addresses, the flow keys are not IP addresses. In such instances, the compact representation may limit possible key range sizes to powers of two. However, flow distribution table 32 may be implemented using a radix tree having nodes that each maps a key prefix to a traffic node (e.g., traffic node 30A or traffic node 30B).

Load monitor 40 monitors the load experienced the traffic node 30, which is inversely correlated to the ability of the traffic node 30 to handle additional flows. Load monitor 40 may monitor the load by, for example, monitoring processor 44 utilization, computing latency of network communication or internal operations, determining round trip delays among control unit 31 components, and determining queue depth for input queues that store references to received network packets. Load monitor 40 may be configured with one or more thresholds that, when met by the load experienced by the traffic node 30, causes load monitor 40 to prompt distribution manager 42 to request that controller 14 migrate at least one key range owned by the traffic node 30. In some examples, load monitor 40 periodically, or on the crossing of a configured threshold, provides load information indicating a load experienced by the traffic node 30 to controller 14. Controller 14 may determine that a rebalancing of key ranges is to occur based at least on the uploaded load information received from the traffic nodes, including the traffic node 30.

Distribution manager 42 communicates with controller 14 to manage FDT 32 entries. Distribution manager 42 receives FDT 32 entries from controller 14 and, in some cases, from other traffic nodes for storage to flow distribution table 32. Distribution manager 42 also sends FDT 32 entries to controller 14 and, in some cases, to other traffic nodes. Upon prompting by load monitor 40, distribution manager 42 may select and migrate a key range owned by traffic node 30A to another traffic node, in cooperation with controller 14. Key range distribution and migration is described more fully below with respect to FIGS. 3-8.

Flow router 35 uses flow distribution table 32 to route packet flows among traffic nodes configured as a distributed computing system to apply a service to packet flows, including traffic node 30A. Flow router 35 executes a flow key computation function to compute a flow key for packets received by traffic node 30A via IFCs 48. The flow key computation may be a hash function, CRC function, or other function by which flow router 35 may transmute properties of a packet to a flow key within the contiguous range of the key space.

As one example, for each packet received to which the service represented by service application 38 is to be applied, flow router 35 applies a hashing function to the packet to compute a flow key for the packet. In some examples, flow router 35 applies the hashing function to the packet by applying the hashing function to fields of the packet, such as a combination of the IP source address and IP destination address of the packet, or to a tunnel identifier for example. Flow router 35 may consistently apply the hashing function to the same fields for all packets. The hash function may be, e.g., SHA-1, MD5, or a cyclic redundancy check such as CRC32 or CRC64. In various deployment scenarios, such as to a data center, enterprise, or service provider, traffic nodes 10 of virtual appliance 6 may apply the hashing function to different fields. For example, in some deployments, the input to the hashing function may be a combination of the source network address and the destination address. As another example, in some deployments, the input to the hashing function may be a combination of VxLAN tag and destination address.

As used herein, "hash a packet" or similar phrase refers to an operation of flow router 35 to apply the hashing function to packet fields of the packet, e.g., to one of the n-tuples of the packet. Computing the hash function for the packet results in a hashing function value that resolves to a "hash index" that is within the range of the key space configured for any of traffic nodes 30A-30B. For instance, a 24-bit key space compels the hashing function value to be within $[0, 2^{24}-1]$, inclusive, or another identical-sized range. The size of the key space may be a configurable value. Flow router 35 may compute the hash index by computing the modulus of the hashing function value and the size of the key space.

Each hash index (or "hash bucket") of the hashing function is a flow key in the key space, which flow router 35 uses to query flow distribution table 32. Flow distribution table 32 includes at least one table entry that matches the flow key. As used herein, a table entry of FDT 32 "matches" a flow key if the key range specified by the table entry is the smallest key range that includes the flow key out of all key ranges specified by table entries of FDT 32.

Upon computing the flow key for a received packet, flow router 35 queries flow distribution table 32 to determine the matching table entry. For example, flow router 35 may walk a radix tree or other tree implementation of FDT 32 to identify the longest prefix and therefore matching key range that includes the flow key (the longest prefix key range is the smallest key range that includes the flow key). Upon determining the matching table entry for a packet, flow router 35 may forward the packet to the traffic node specified by the matching table entry. In some cases, traffic node 30A is the traffic node specified by the matching table entry. In such cases and if the packet is an initial packet for a flow, flow router 35 may modify a data structure for the matching table entry to record the new flow in history of flows having flow keys that match the key range specified by the matching table entry. In addition, flow router 35 may direct service application 38 to apply the service to the packet.

Service application 38 applies the service that is provided by traffic nodes, including traffic node 30A or traffic node 30B, that are configured as a distributed computing system to provide the service. The service may include, e.g., firewall, CG-NAT, load balancing, video or other media optimization, Transmission Control Protocol (TCP) proxy, IPSec/VPN, subscriber management, policy enforcement, Traffic Detection Function (TDF). In some cases, service application 38 may apply a combination multiple different services, such as firewall and CG-NAT. In some examples, multiple instances of service application 38 apply different services associated with different flow distribution tables of any of traffic nodes 30A, 30B. For example, traffic node 30A may include multiple instances of flow distribution table 32 that each correspond to a different application supported by traffic node 30A, and multiple instances of service application 38 may apply respective services to packets forwarded according to the corresponding instances of flow distribution table 32.

Flow table 36 stores representations of packet flows that are anchored by the corresponding traffic node 30A-30B and in the process of having the service applied to the flows by service application 38. In addition to packet field values capable of uniquely identifying a matching packet flow anchored by the corresponding traffic node 30A-30B, a flow table 36 entry may include flow statistics, state data, and other data usable by service application 38 to process a represented anchored flow. Traffic nodes 30A-30B may add an entry to flow table 36 upon receiving a TCP SYN packet or UDP packet that matches a key range for which the traffic node is an owner. In some cases, as described below with respect to FIG. 2B and when a UDP packet flow matches a key range in the process of migrating, traffic node 30B may add an entry to flow table 36 for the UDP packet flow only after having ping-ponged a packet for the UDP packet flow between itself as a target traffic node and a source traffic node.

Traffic node 30A also includes exact match table 34, which may represent a separate table listing exact matches for flows. Each entry in exact match table 34 may include one or more packet field values that uniquely identify a matching packet flow. Because multiple packet flows may collide to a particular flow key, to uniquely identify matching packet flows, exact match table 34 entries may specify packet field values rather than flow keys.

Distribution manager 42 of traffic node 30A receives exact match table 34 entries originated by other traffic nodes that have migrated key prefixes but also have at least one active flow that matches the migrated key prefixes. Flow router 35 attempts to match packet field values for packets of the packet flow to the exact match table 34. If a matching exact match table 34 entry for a packet is present, flow router 35 forwards the packet to the traffic node specified by the matching entry. Likewise, distribution manager 42 sends, to other traffic nodes, exact match table entries for active flows in flow table 36 that have flow keys matching key ranges migrated to respective target traffic nodes by distribution manager 42.

Distribution manager 42 also installs the exact match table entries to exact match table 34. These exact match table entries specify traffic node 30A as the owner traffic node for the matching packet flows and may be considered exceptions to the migrated key ranges. Upon the termination of an active flow, distribution manager 42 may send, to the target traffic node that is the new owner of a key range that previously matched the active flow key, a message that revokes the exact match table entry for the packet flow and effectively removes the exception to the key range.

In the example traffic node 30B of FIG. 2B, control unit 31B of FIG. 2B executes flow router 54, service application 38, load monitor 40, and distribution manager 42 to implement a flow distribution table lookup service according to techniques described herein. Flow distribution table (FDT) 50 stored to a computer-readable storage medium of control unit 31B of the traffic node 30B of FIG. 2B maps key ranges of a packet flow key space to instances of traffic node 30B. Flow router 54 may use flow distribution table 50 in a manner similar though not identical to that described above with respect to the use of flow distribution table 32 by flow router 35 of FIG. 2A. However, flow distribution table 50 does not include an exact match table 34 and, accordingly, flow router 54 uses a key range notation scheme described in further detail below.

Service application 38 of control unit 31B operates with respect to flow table 52 in a manner similar to that of service application 38 of control unit 31A with respect to flow table 36. Distribution manager 42 of control unit 31B operates with respect to flow distribution table 50 in a manner similar to that of distribution manager 42 of control unit 31A with respect to flow table flow distribution table 32.

Flow distribution table 50 is an associative data structure having one or more table entries (or tree/trie nodes that are also referred to herein as "table entries") that each associate a different key range with a traffic node. Each table entry for a key range may also include a data structure to record a history of flows having flow keys that match the key range. The data structure may be, for instance, a counter that increments upon each new flow mapped to the key range or a list structure that includes records specifying flow keys that match the key range and the respective number of flows (if any) mapped to the flow keys. Flow distribution table 50 may be implemented using a table, tree/trie, or a combination thereof.

Control unit 31B of FIG. 2A executes flow router 54, service application 38, load monitor 40, and distribution manager 42 to implement a flow distribution table lookup service according to techniques described herein. Flow distribution table (FDT) 50 stored to a computer-readable storage medium of control unit 31B maps key ranges of a packet flow key space to instances of traffic node 30B. Flow distribution table 50 is an associative data structure having one or more table entries (or tree/trie nodes that are also referred to herein as "table entries") that each associate a different key range with a traffic node. Each table entry for a key range may also include a data structure to record a history of flows having flow keys that match the key range. The data structure may be, for instance, a counter that increments upon each new flow mapped to the key range or a list structure that includes records specifying flow keys that match the key range and the respective number of flows (if any) mapped to the flow keys. Flow distribution table 50 may be implemented using a table, tree/trie, or a combination thereof.

Traffic node 30B implements a migrating key range notation scheme in which distribution manager 42 indicates key ranges of flow distribution table 50 that are in the process of being migrated between a source traffic node and a destination traffic node. Key ranges of flow distribution table 50 that are in the processing of being migrated from a source traffic node to a target traffic node may each be associated with a migration indication, specifically, a migrating out ("MIGRATING_OUT") indication or a migrating in ("MIGRATING_IN") indication. In the context of the migrating key range notation scheme, the process of migrating a key range may extend for so long as the last remaining packet flow that matches the migrating key range and being processed by the source traffic node is active. For traffic node 30B, a migrating out indication for a key range indicates that traffic node 30B is a source traffic node for the key range. Again for traffic node 30B, a migrating in indication for a key range indicates that traffic node 30B is a target traffic node for the key range. A migrating key range of flow distribution table 50 may further be associated with a target traffic node value for the migrating key range. In later phases of the migration process, the target traffic node may be the owner traffic node for the migrating key range.

Flow router 54 may facilitate forwarding to the appropriate traffic node (e.g., any of traffic nodes 10) for processing as follows. After traffic node 30B receiving a packet, flow router 54 computes a flow key for the packet and determines the matching key range for the packet using flow distribution table 50. Flow router 54 further determines whether the matching key range is associated with a migration indication.

If the matching key range is associated with a migrating out indication (i.e., traffic node 30B is a source traffic node for the matching key range) and the packet is a TCP SYN packet, flow router 54 forwards the packet to the target traffic node for the migrating, matching key range. If the matching key range is associated with a migrating out indication and the packet is not a TCP SYN packet (i.e., a UDP packet or a TCP non-SYN packet), flow router 54 queries flow table 36 to determine whether traffic node 30B is currently processing the packet flow to which the packet belongs. If flow table 36 includes a matching flow for the packet, traffic node 30B anchors the packet flow as an exception to the migrating key range, and service application 38 applies the service to the packet accordingly. If flow table 36 does not include a matching flow, the packet flow to which the packet belong is anchored to the target traffic node, and flow router 54 forwards the packet to the target traffic node.

If the matching key range is associated with a migrating in indication (i.e., traffic node 30B is a target traffic node for the matching key range) and the packet is a TCP SYN packet, service application 38 applies the service to the packet for what is qualified as a new packet flow. Flow router 54 may add an entry to flow table 36 for the new packet flow. If the matching key range is associated with a migrating out indication and the packet is not a TCP SYN packet, flow router 54 queries flow table 36 to determine whether traffic node 30B is currently processing the packet flow to which the packet belongs. If flow table 36 includes a matching flow for the packet, traffic node 30B anchors the packet flow, and service application 38 applies the service to the packet accordingly. If flow table 36 does not include a matching flow, the packet flow to which the packet belong is anchored to the source traffic node as an exception to the migrating key range, and flow router 54 forwards the packet to the source traffic node. If traffic node 30B receives the packet back from the source traffic node, the packet has "ping-ponged" between the target traffic node (traffic node 30B) and the source traffic node. In such cases, if the packet is a UDP packet, flow router 54 adds an entry to flow table 36 for the UDP packet flow to which the packet belongs to recognize the new flow and service application 38 applies the service to the packet. Again in such cases, if the packet is a TCP non-SYN packet, flow router 54 discards the packet because the flow ought already to have been created by either of traffic node 30B or the source traffic node in response to a previous TCP SYN packet for the packet flow to which the packet belongs. Flow router 54 may in some cases create records for forwarded packets to track whether such packets ping-pong between the target traffic node and the source traffic node.

In some cases, traffic node 30B that has a flow distribution table 50 having a key range associated with a migrating out indication may query the flow table 52 to determine whether any remaining flows match the key range associated with the migrating out indication. If no such flow remain in flow table 52, distribution manager 42 may remove the migrating out indication for the migrated key range and advertise, to the target traffic node for the migrated key range, that the migration is complete and that traffic node 30B has no remaining exceptions to the migrated key range. The target traffic node may therefore process all matching packets for the migrated key range.

Figure 3:
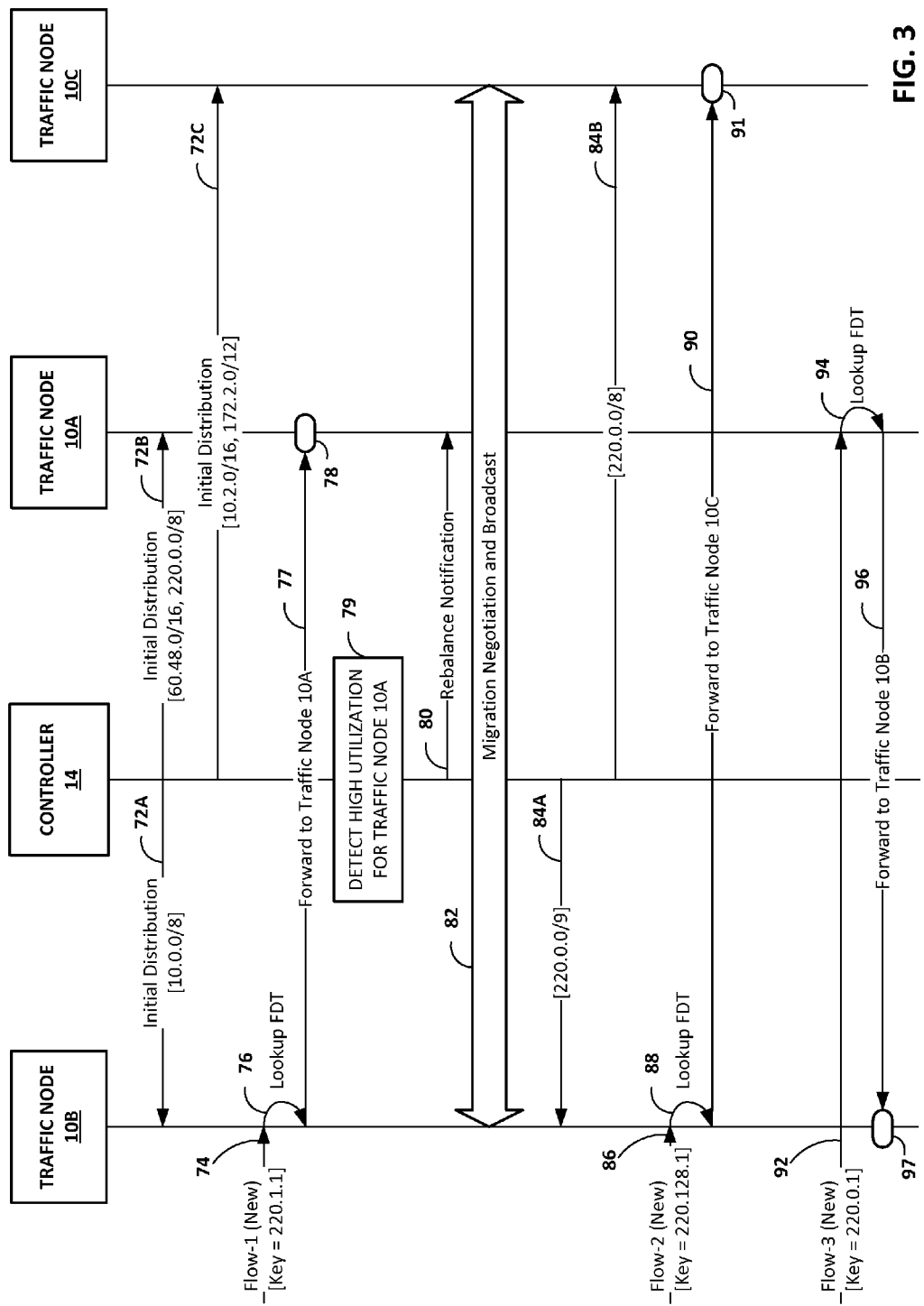
FIG. 3 depicts a flow diagram illustrating examples of flow key distribution, migration, and packet flow forwarding according to techniques described in this disclosure.

FIG. 3 depicts a flow diagram illustrating examples of flow key distribution, migration, and packet flow forwarding according to techniques described in this disclosure. FIG. 3 illustrates operations of controller 14 and traffic nodes 10A-10C of FIG. 1 to initially distribute and migrate key ranges of a flow key space and to forward packet flow packets according to traffic node 10 ownership indicated by the key ranges distribution and migration. Traffic nodes 10A-10C may represent less than all of the traffic nodes 10 of a distributed computing system configured to apply a service to packet flows.

Controller 14 determines and assigns an initial distribution of key ranges to the traffic nodes 10. In this example, the key space is 24 bits. Controller 14 apportions the entire key space among traffic nodes 10. Controller 14 may divide the key space into key ranges of different sizes, such as /8, /12, and /16, and may in some cases assign the key ranges to traffic nodes 10 according to capacities of the traffic nodes 10. Controller 14 may further distribute key ranges randomly, semi-randomly, or in a round robin fashion to facilitate ownership of non-contiguous ranges by each of the traffic nodes 10. In the illustrated example, which concerns less than the entirety of the key space, controller 14 assigns key range 10.0.0/8 to traffic node 10B and distributes the assignment using message 72A to traffic nodes 10. Controller 14 assigns key ranges 60.48.0/16 and 220.0.0/8 to traffic node 10A and distributes the assignment to traffic nodes 10 (72A). Controller 14 also assigns key ranges 10.2.0/16 and 172.2.0/12 to traffic node 10C and distributes the assignment to traffic nodes 10 (72B). Although FIG. 3 illustrates steps 72A, 72B, and 72C as directed to respective traffic nodes 10B, 10A, and 10C, controller 14 distributes a representation of the initial key range assignments to each of the traffic nodes 10 to assure uniform flow distribution tables 12 among the traffic nodes 10.

Subsequently to the initial distribution, traffic node 10B receives an initial data packet for a new flow, "Flow-1," and computes a flow key for the initial data packet (and thus for Flow-1) as 220.1.1 (74). Traffic node 10B queries its FDT 12B to determine the matching FDT 12B table entry, which in this case specifies the 220.0.0/8 key range initially distributed to traffic node 10A (76). The matching FDT 12B thus specifies traffic node 10A as the owner of key range matching the Flow-1 flow key, and traffic node 10B forwards the initial data packet to traffic node 10A (77), which applies the service to the packet (78).

Subsequently, controller 14 detects that traffic node 10A is experiencing an excessive load (e.g., experiencing high resource utilization) according to a load algorithm that may account for, e.g., a remaining capacity of traffic node 10A (79). Controller 14 may determine that traffic node 10A is experiencing an excessive load using load information uploaded from traffic node 10A to controller 14.

In response to determining the excessive load experienced by traffic node 10A, controller 14 directs traffic node 10A to rebalance the key ranges owned by traffic node 10A (80). Traffic node 10A therefore selects key ranges and migrates the selected key ranges according to a migration negotiation and broadcast procedure (82), which is described in further detail with respect to FIGS. 5-6. Traffic node 10A may determine key ranges that it is willing to redistribute (or conversely, the key ranges that it is to retain) and migrate according to the number of, and in some cases packet activity for, active flows currently owned by traffic node 10A as well as the load and capacity of traffic node 10A. As described in further detail elsewhere in this disclosure, traffic node 10A may also send exact match table entries for FDTs 12 of target traffic nodes 10 for migrated ranges in an extended case.

As a result of the migration negotiation and broadcast procedure (82), traffic node 10A is to retain new key ranges 220.1.0/24 and new 220.101.0/16, migrate new key range 220.0.0/9 to traffic node 10B by operation of controller 14 (84A), and migrate key range 220.0.0/8 to traffic node 10C by operation of controller 14 (84B). That is, controller 14 distributes the key ranges to the various traffic nodes 10 in this example to facilitate consistent FDTs 12. Retained key ranges 220.1.0/24 and 220.101.0/16 and migrated key range 220.0.0/9 are all sub-ranges of the migrated key range 220.0.0/8 initially distributed to traffic node 10A by controller 14. The term "sub-range" of a key range refers to one or more contiguous flow keys in which each flow key in the sub-range is also a flow key in the key range.

Traffic node 10B subsequently receives an initial data packet for a new flow, "Flow-2," and computes a flow key for the initial data packet (and thus for Flow-2) as 220.128.1 (86). Flow key 220.128.1 does not match any of the key ranges 220.1.0/24, 220.101.0/16, and 220.0.0/9 that are sub-ranges of 220.0.0/8. Accordingly, the FDT 12B lookup by traffic node 10B resolves to a traffic node 10C that now owns key range 220.0.0/8 (88), and traffic node 10B forwards the initial packet to traffic node 10C (90), which applies the service to the packet (91). As another illustrated example, traffic node 10A receives an initial data packet for a new flow, "Flow-3," and computes a flow key for the initial data packet (and thus for Flow-3) as 220.0.1 (92). Traffic node 10A queries FDT 12A to determine that the longest prefix key range match for 220.0.0.1 according to the current state of FDTs 12 is 220.0.0/9 migrated to traffic node 10B (94). Accordingly, traffic node 10A forwards the packet for Flow-3 to traffic node 10B (96), which applies the service to the packet (97).

Because router 8 may forward packets for a new flow to any of traffic nodes 10, having consistent FDTs 12 among traffic nodes 10 may reduce a number of hops for the packets to reach the anchor traffic node 10 for the flow. In the steady-state, the techniques described herein facilitate packet forwarding such that only one hop may be needed to reach the owner traffic node 10 of the packet flow key for any given flow. During a migration procedure in which active flows remain in-process and have flow keys that match migrated key ranges, the techniques facilitate efficient forwarding such that not more than two hops are required for the active flow packets. In addition, this may ensure that service application performance does not degrade even during dynamic disabling and enabling of traffic nodes 10 while flows are in-process.

Figures 4A, 4B:
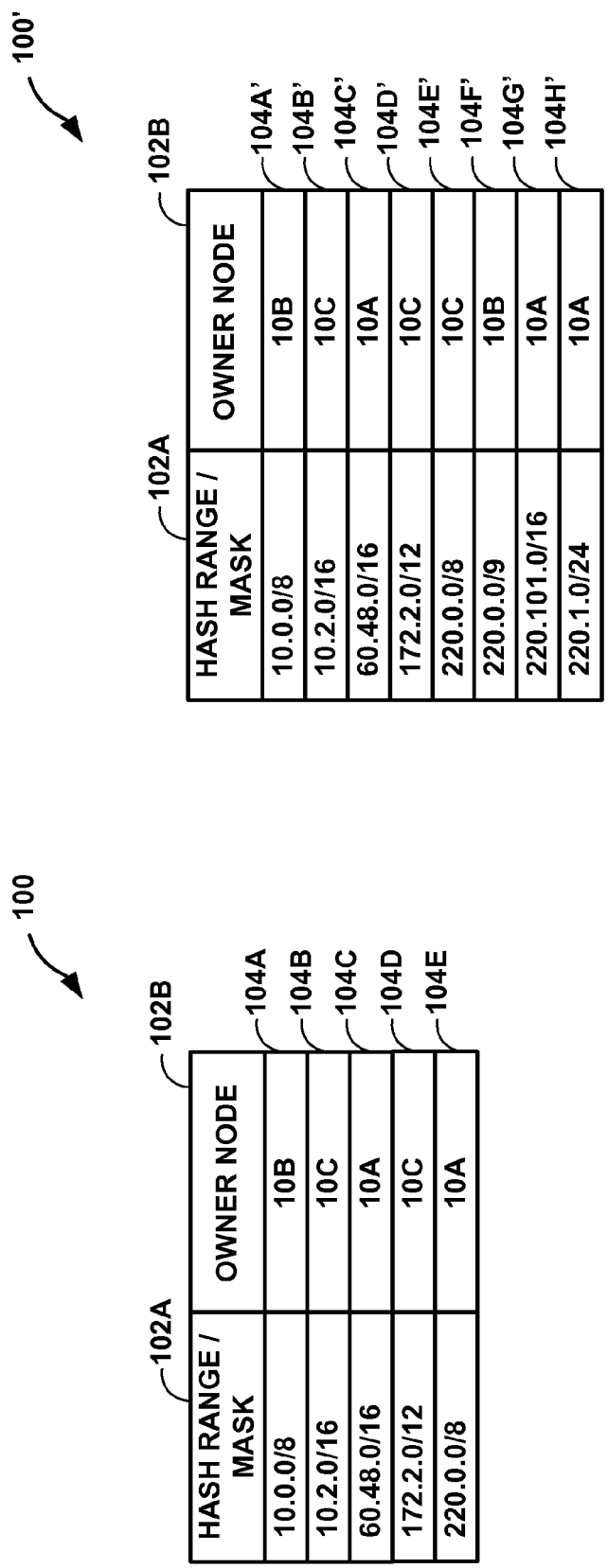
FIGS. 4A-4B are tables illustrating different states of an example flow distribution table according to techniques described herein.

FIGS. 4A-4B are tables illustrating different states of an example flow distribution table 100 according to techniques described herein. Flow distribution table 100 includes hash range/mask column 102A ("key range 102A") and owner traffic node column 102B ("owner node 102B"). Owner node 102B may represent an IP address, LSP label, tunnel identifier, router identifier, or other node identifier ("node-ID") by which traffic nodes 10 may address and forward data packets to other traffic nodes 10. The key range in this example is a key range for a hash function value space, i.e., a hash range, and the key range is presented in key range 102A using CIDR notation with a mask value to denote the prefix size. Flow distribution table 100 may represent an example of any of FDTs 12 of FIG. 1 or FDT 32 of FIGS. 2A-2B and, further, may represent a flow distribution table after the initial distribution steps 72A, 72B, and 72C of FIG. 3. Each of FDT 100 entries 104A-104E associates a key range specified by the key range 102A for the entry with the traffic node that owns the key range as specified by owner node 102B. For example, FDT 100 entry 104E associates key range 220.0.0/8 with traffic node 10A. Accordingly, among traffic nodes 10 for a distributed computing system that applies a service to the packet flows received by any of the traffic nodes 10, traffic node 10A anchors and applies the service to flows having flow keys that have a longest prefix match to 220.0.0/8.

FIG. 4B illustrates flow distribution table 100' modified from flow distribution table 100 of FIG. 4A after a migration and broadcast procedure to migrate key ranges of the key space, such as the migration and broadcast procedure 82 of FIG. 3. In this example, FDT 100' includes FDT entries 104A'-104H' that define the new associations between key ranges and owner traffic nodes. For example, FDT entry 104E' defines an association between migrated key range 220.0.0/8 and traffic node 10C.

Some examples of flow distribution table 100 may include an additional migration indication column that includes, for each of FDT entries 104, a value that indicates whether the traffic node that includes flow distribution table 100 is a source traffic node (MIGRATING_OUT) or a destination traffic node (MIGRATING_IN) for the corresponding key range that is in the process of being migrated. Flow distribution table 100 may further include a target traffic node column that indicates a target traffic node for the corresponding key range that is in the process of being migrated. Use of migration indication for a migrating key range for forwarding packets is described above with respect to FIG. 2B.

Figure 5:
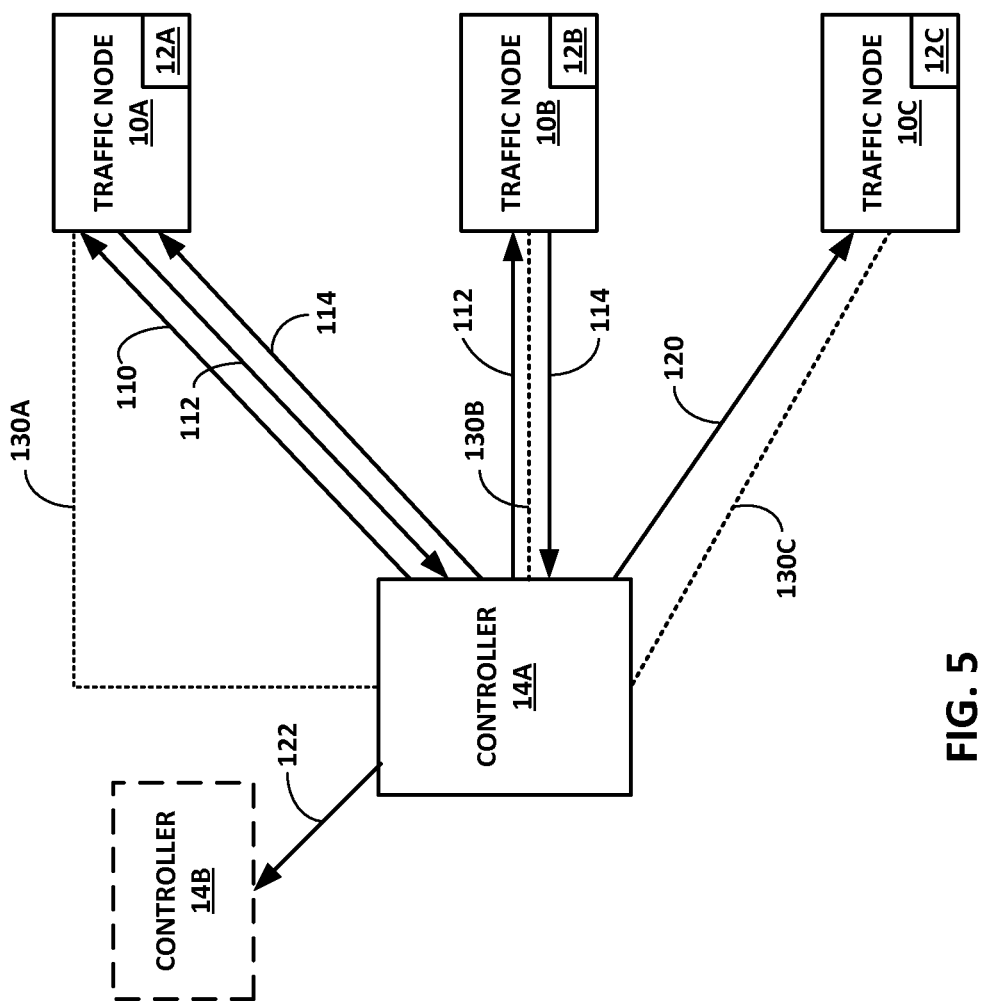
FIG. 5 is a block diagram illustrating a centralized approach for key range migration and broadcast according to techniques described in this disclosure.

FIG. 5 is a block diagram illustrating a centralized approach for key range migration and broadcast according to techniques described in this disclosure. The centralized approach may represent an example of migration and broadcast procedure 82 of FIG. 3. In this example, controller 14A is an active controller for the distributed computing system made up of traffic nodes 10 (only traffic nodes 10A-10C shown for ease of illustration). Controller 14A as the active controller may represent controller 14 of FIGS. 1A-1B and FIG. 3. Backup controller 14B is an optional controller that stores a representation of the state of a migration process for traffic nodes 10. Active controller 14A synchronizes the representation of backup controller 14B by providing synchronization messages for resuming the migration process. In the event of failure of active controller 14A, backup controller 14B may assume responsibility for continuing the key range migration and FDT synchronization process.

In the centralized approach, source traffic nodes 10 migrate key ranges to target traffic nodes 10 via controller 14A. Traffic nodes 10 may not have communication sessions with one another. However, traffic nodes 10A-10C have a respective communication sessions 130A-130C with controller 14A. Each of communication sessions 130A-130C may represent a Remote Authentication Dial-In User Service (RADIUS)/Diameter session, eXtensible Messaging and Presence Protocol (XMPP) session or other messaging protocol session, XML Remote Procedure Call (XML-RPC), HyperText Transfer Protocol, Netconf, or any other application layer protocol by which controller 14A and traffic nodes 10 may exchange key range migration messages, including range migration negotiation, range migration update, and range migration broadcast, and rebalance notification messages. Each of communication session 130A-130C may operate over a transport protocol such as TCP or User Datagram Protocol (UDP).

In the example of FIG. 5, controller 14A determines that a new traffic node 10B is added to the system or that traffic node 10A is experiencing and excessive load. Controller 14A therefore sends rebalance notification message 110 to traffic node 10A to indicate that traffic node 10B (whether new or pre-existing) can offload some of the load by assuming ownership of key ranges currently owned by traffic node 10A. Traffic node 10A, in turn, sends a range migration negotiation message 112 to target traffic node 10B via controller 14A. That is, controller 14A relays range migration negotiation message 112, originated by source traffic node 10A, to target traffic node 10B. Range migration negotiation message 112 includes at least one key range currently owned by source traffic node 10A and is in effect an offer to target traffic node 10B to assume ownership of the at least one key range selected by source traffic node 10A for migration.

Traffic node 10B may accept or reject one or more key ranges offered in range migration negotiation message 112. If rejected, target traffic node 10B sends a rejection (NAK) message to source traffic node 10A, which may select a different key range and present a new offer. If accepted, target traffic node 10B sends an acknowledgement message 114 to source traffic node 10A via controller 14A. Target traffic node 10B and source traffic node 10A update respective FDT 12B and FDT 12A to account for the migrated key range(s). In addition, controller 14A broadcasts a range migration broadcast message 120 to any other traffic nodes 10 (traffic node 10C in the illustrated example) to indicate that target traffic node 10B is the new owner of the migrated key range(s).

Each of messages 110, 112, 114, and 120 may be synchronized to controller 14B to allow controller 14B to assume responsibility for the key migration process in the event of a failure of controller 14A. In this way, the distributed computing system made up of traffic nodes 10 may use the messaging state synchronized to redundant controller 14B to reduce and in some cases eliminate FDT synchronization failure.

Figure 6:
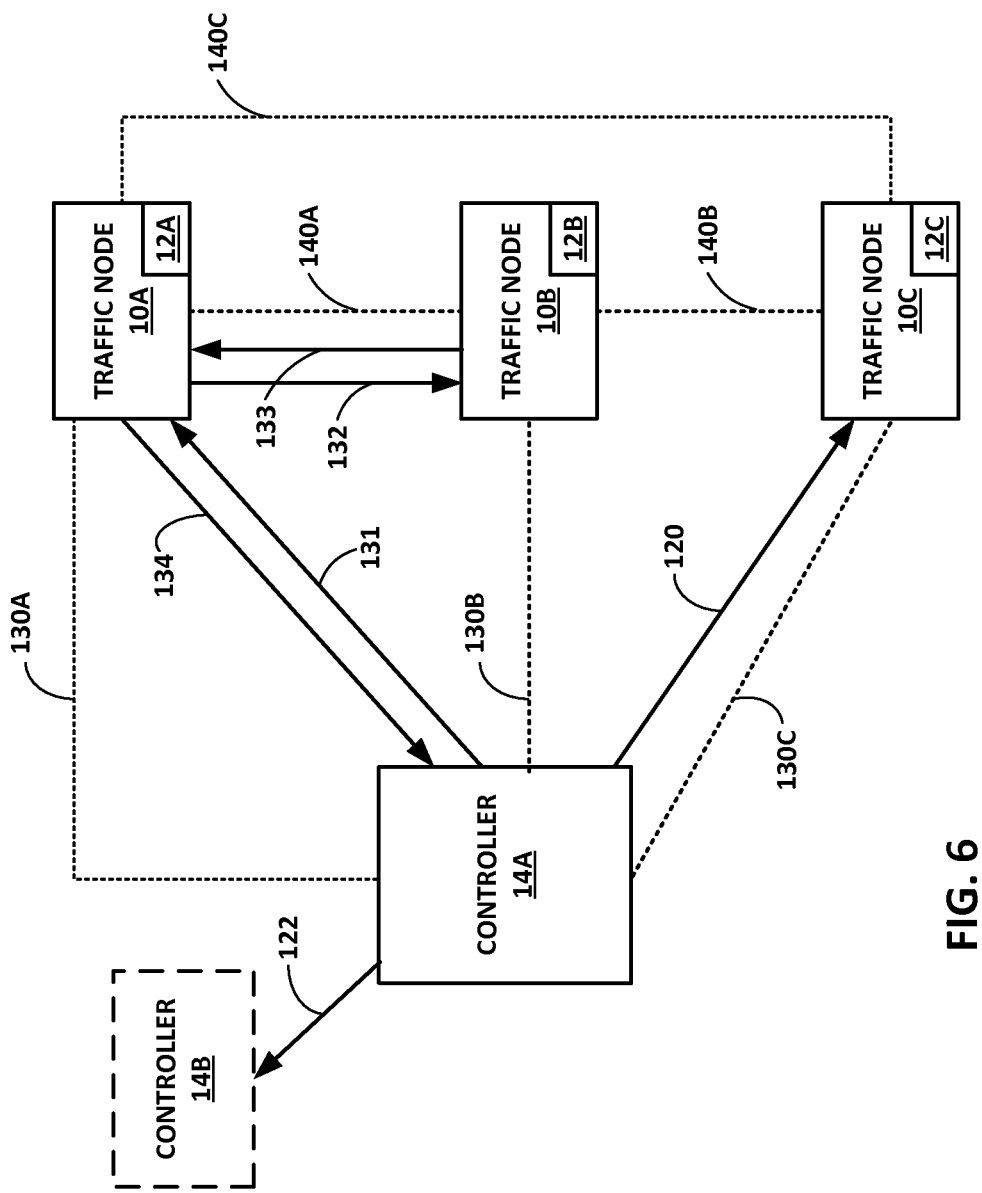
FIG. 6 is a block diagram illustrating a distributed approach for key range migration and broadcast according to techniques described in this disclosure.

FIG. 6 is a block diagram illustrating a distributed approach for key range migration and broadcast according to techniques described in this disclosure. The distributed approach may represent an example of migration and broadcast procedure 82 of FIG. 3. In this example, like that of FIG. 5, active controller 14A synchronizes key range migration messages to a backup controller 14B to allow the backup controller 14B to resume a key range migration process in the event of a failure of active controller 14A.

In a distributed approach, traffic nodes 10 establish a full mesh of communication sessions 140, which may conform to a protocol in a manner similar to communication sessions 130 of FIGS. 5-6. This may reduce the overall number of key range migration messages required for a key range migration process. In this example, communication sessions 140A-140C transport key range migration messages among traffic nodes 10. Controller 14A sends rebalance notification message 131 to traffic node 10A to indicate that traffic node 10B (whether new or pre-existing) can offload some of the load by assuming ownership of key ranges currently owned by traffic node 10A.

Traffic node 10A, in turn, sends a range migration negotiation message 132 directly to target traffic node 10B. Range migration negotiation message 132 includes at least one key range currently owned by source traffic node 10A and is in effect an offer to target traffic node 10B to assume ownership of the at least one key range selected by source traffic node 10A for migration.

Traffic node 10B may accept or reject the at least one key range offered in range migration negotiation message 132. If accepted, target traffic node 10B sends an acknowledgement message 133 to source traffic node 10A. Target traffic node 10B and source traffic node 10A update respective FDT 12B and FDT 12A to account for the migrated key range(s). In addition, source traffic node 10A sends range migration update message 134 to controller 14A to indicate that source traffic node 10A has migrated key range(s) to traffic node 10B. Controller 14A broadcasts a range migration broadcast message 120 to any other traffic nodes 10 (traffic node 10C in the illustrated example) to indicate that target traffic node 10B is the new owner of the migrated key range(s).

Each of messages 131, 134, and 120 may be synchronized to controller 14B to allow controller 14B to assume responsibility for the key migration process in the event of a failure of controller 14A. In this way, the distributed computing system made up of traffic nodes 10 may use the messaging state synchronized to redundant controller 14B to reduce and in some cases eliminate FDT synchronization failure.

Figure 7:
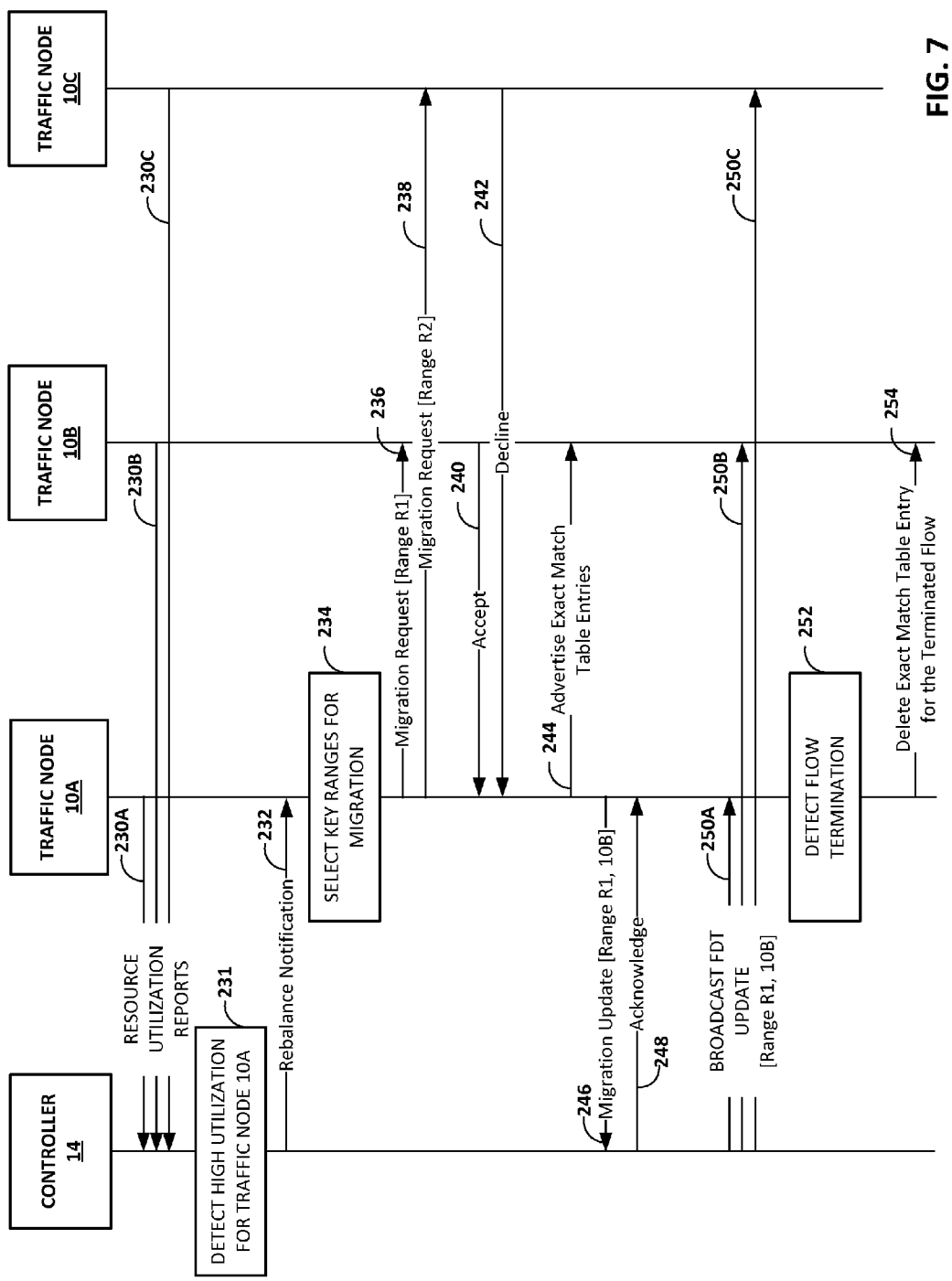
FIG. 7 is a flow diagram illustrating a flow key range migration process in accordance with techniques described herein.

FIG. 7 is a flow diagram illustrating a flow key range migration process in accordance with techniques described herein. Controller 14 and traffic nodes 10A-10C cooperate to migrate key ranges of a flow key space and to forward packet flow packets according to traffic node 10 ownership according to the key ranges migration. Traffic nodes 10A-10C may represent less than all of the traffic nodes 10 of a distributed computing system configured to apply a service to packet flows.

Traffic nodes 10A-10C provide, to controller 14, respective resource utilization reports in steps 230A-230C that indicate load information for respective loads experienced by the traffic nodes 10. Traffic nodes 10A-10C may provide the resource utilization reports periodically or, in some case, upon the meeting a condition such as traffic node 10A resource utilization crossing a utilization threshold. Subsequently, controller 14 detects that traffic node 10A is experiencing an excessive load (e.g., experiencing high resource utilization) according to a load algorithm that may account for, e.g., a remaining capacity of traffic node 10A (231). Controller 14 may determine that traffic node 10A is experiencing an excessive load using load information uploaded from traffic node 10A to controller 14 in a resource utilization report per step 130A.

Controller 14 sends a rebalance notification message to traffic node 10A to indicate that traffic nodes 10B and 10C (whether new or pre-existing) can offload some of the load by assuming ownership of key ranges currently owned by traffic node 10A (232). The rebalance notification message in this example includes rebalancing information that indicates an amount of load or an amount of its key range that traffic node 10A may offload to the target traffic nodes 10. For example, the rebalancing information may specify that traffic node 10A may offload 10% of its load (or 10% of its overall owned key range) to target traffic node 10B and may also offload 12% of its load (or 12% of its overall owned key range) to target traffic node 10C. Controller 14 may determine the rebalancing information according to the resource utilization reports from traffic nodes 10.

In response to receiving the rebalance notification message, traffic node 10A selects key ranges from its owned key ranges to migrate to target traffic nodes 10 according to rebalancing information received in the rebalance notification message (234). In particular, traffic node 10A in this example selects key range R1 (a placeholder for a numerical key range) for migration to traffic node 10B and further selects key range R2 for migration to traffic node 10C. Source traffic node 10A sends corresponding range migration requests to the target traffic nodes 10B, 10C either directly in the distributed scheme (illustrated in FIG. 6) or via controller 14 in the centralized scheme (illustrated in FIG. 5). Specifically, source traffic node 10A sends range migration request message specifying range R1 for migration to target traffic node 10B (236) and also sends range migration request message specifying range R2 for migration to target traffic node 10C (238).

Target traffic node 10B responds to the range migration request message specifying range R1 by returning a range migration accept message to source traffic node 10A (240). Target traffic node 10C, however, responds to the range migration request message specifying range R2 by returning a range migration reject message to source traffic node 10A (242). Source traffic node 10A may thereafter attempt to migrate a different, potentially smaller, key range to target traffic node 10C or may attempt to migrate range R2 to a different traffic node 10.

In response to the range migration accept message from target traffic node 10B, source traffic node 10A sends one or more exact match table entries for active flows having flow keys that match range R1 to target traffic node 10B (244). The exact match table entries cause target traffic node 10B to forward packets that match the exact match table entries to source traffic node 10A so the in-process service application may continue uninterrupted. Traffic node 10B may in some instances acknowledge receipt of the exact match table entries.

After sending the exact match table entries for range R1 that is in the process of migration to target traffic node 10B, source traffic node 10A sends a migration update message to controller 14 that indicates source traffic node 10A is ready for target traffic node 10B to assume ownership of range R1 (246). Controller 14 may acknowledge the migration update message (248). Controller 14 then broadcasts migration update messages to each of traffic nodes 10A-10C to modify the respective FDTs 12A-12C for the traffic nodes 10A-10C with an FDT entry that associates range R1 with new owner traffic node 10B (250A-250C). In this way, controller 14 may ensure atomicity and synchronicity of the modification of FDTs 12. Traffic nodes 10A-10C may forward packet flows according to the modified FDTs 12 and the exact match table entries, as described in further detail with respect to FIG. 8.

Subsequently, traffic node 10A may determine that a packet flow that was active during the key range migration of range R1, which matched a flow key for the packet flow, has terminated (252). Traffic node 10A may detect flow termination using timers, by inspecting TCP headers, etc. Because the packet flow is no longer active, traffic node 10A removes the exception to range R1 by sending a delete exact match table entry message for the packet flow and causes traffic node 10B to delete the exact match table entry for the packet flow (254).

Figure 8:
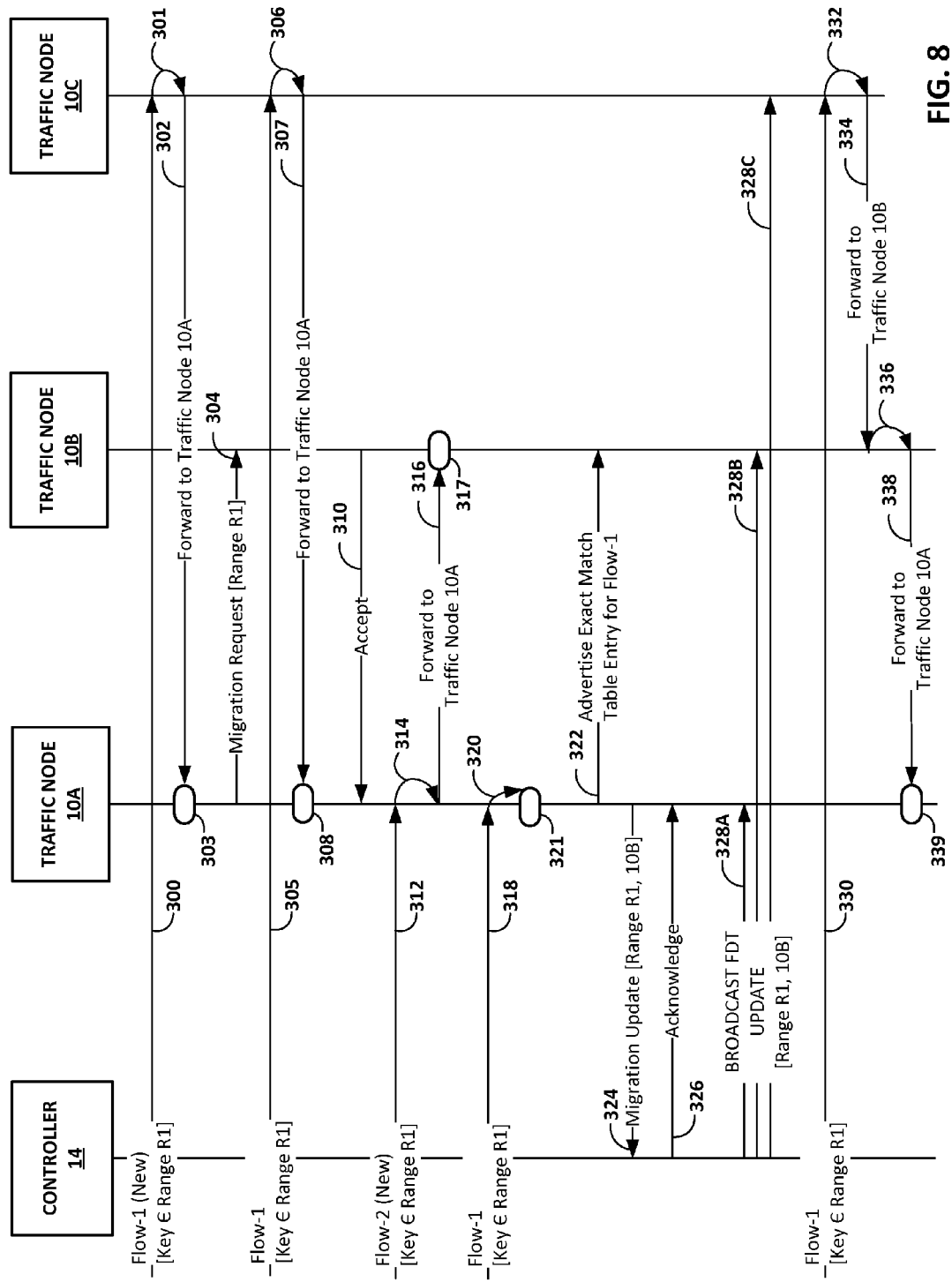
FIG. 8 is a flow diagram illustrating example operations of traffic nodes for forwarding packet flow packets before, during, and after a migration process for a key range in which a controller participates, in accordance with techniques described in this disclosure.

FIG. 8 is a flow diagram illustrating example operations of traffic nodes 10 for forwarding packet flow packets before, during, and after a migration process for a key range R1 in which controller 14 participates, in accordance with techniques described in this disclosure. At an initial stage in the flow diagram, traffic node 10A owns range R1. Accordingly, when traffic node 10C receives an initial packet for a new flow, "Flow-1," having a flow key that matches range R1 (300), traffic node 10C matches the flow key to the FDT 12C entry specifying traffic node 10A (301) and forwards the packet to traffic node 10A (302). Traffic node 10A applies the service to the packet (303).

Traffic node 10A may subsequently select range R1 for migration and send a range migration request message specifying range R1 to traffic node 10B (304). Prior to receiving a confirmation from traffic node 10B in the form of a range migration request accept message, traffic node 10C receives an additional Flow-1 packet (305). Because the range migration request is not yet confirmed and broadcast, traffic node 10C matches the flow key to the FDT 12C entry specifying traffic node 10A (306) and forwards the packet to traffic node 10A (307), which applies the service to the packet (308).

Traffic node 10A then receives range migration request accept message in response to the range migration request message specifying range R1 (310). Traffic node 10A modifies FDT 12A to direct packets for new flows having flow keys that match range R1 to traffic node 10B. For example, traffic node 10A subsequently receives an initial packet for a new flow, "Flow-2," having a flow key that matches range R1 (312), traffic node 10A matches the flow key to the FDT 12A entry specifying traffic node 10B (314) and forwards the initial packet to traffic node 10B (316), which applies the service to the packet (317).

In response to the range migration accept message from target traffic node 10B, source traffic node 10A sends one or more exact match table entries for active flows, including Flow-1, having flow keys that match range R1 to target traffic node 10B (322). Target traffic node 10B installs the exact match table entries to its exact match table, e.g., exact match table 34 of FIG. 2A.

After sending the exact match table entries for range R1 that is in the process of migration to target traffic node 10B, source traffic node 10A sends a migration update message to controller 14 that indicates source traffic node 10A is ready for target traffic node 10B to assume ownership of range R1 (324). Controller 14 may acknowledge the migration update message (326). Controller 14 then broadcasts migration update messages to each of traffic nodes 10A-10C to modify the respective FDTs 12A-12C for the traffic nodes 10A-10C with an FDT entry that associates range R1 with new owner traffic node 10B (328A-328C).

Traffic node 10C may subsequently receive a packet for active flow Flow-1 (330). Because FDT 12C has been updated in accordance with the broadcast migration update message received by traffic node 10C (328C), traffic node 10C matches the flow key to the FDT 12C entry specifying traffic node 10B (332) and forwards the packet to traffic node 10B according to the matching FDT 12C entry (334). Traffic node 10B performs an exact match table lookup of the packet, which matches an exact match table entry specifying traffic node 10A as currently processing Flow-1 (336). Traffic node 10B therefore forwards the packet to traffic node 10A (338), which applies the service to the packet (339). In this way, the techniques may provide flow affinity of active flows and reduce traffic loss and/or stale sessions.

Figure 9:
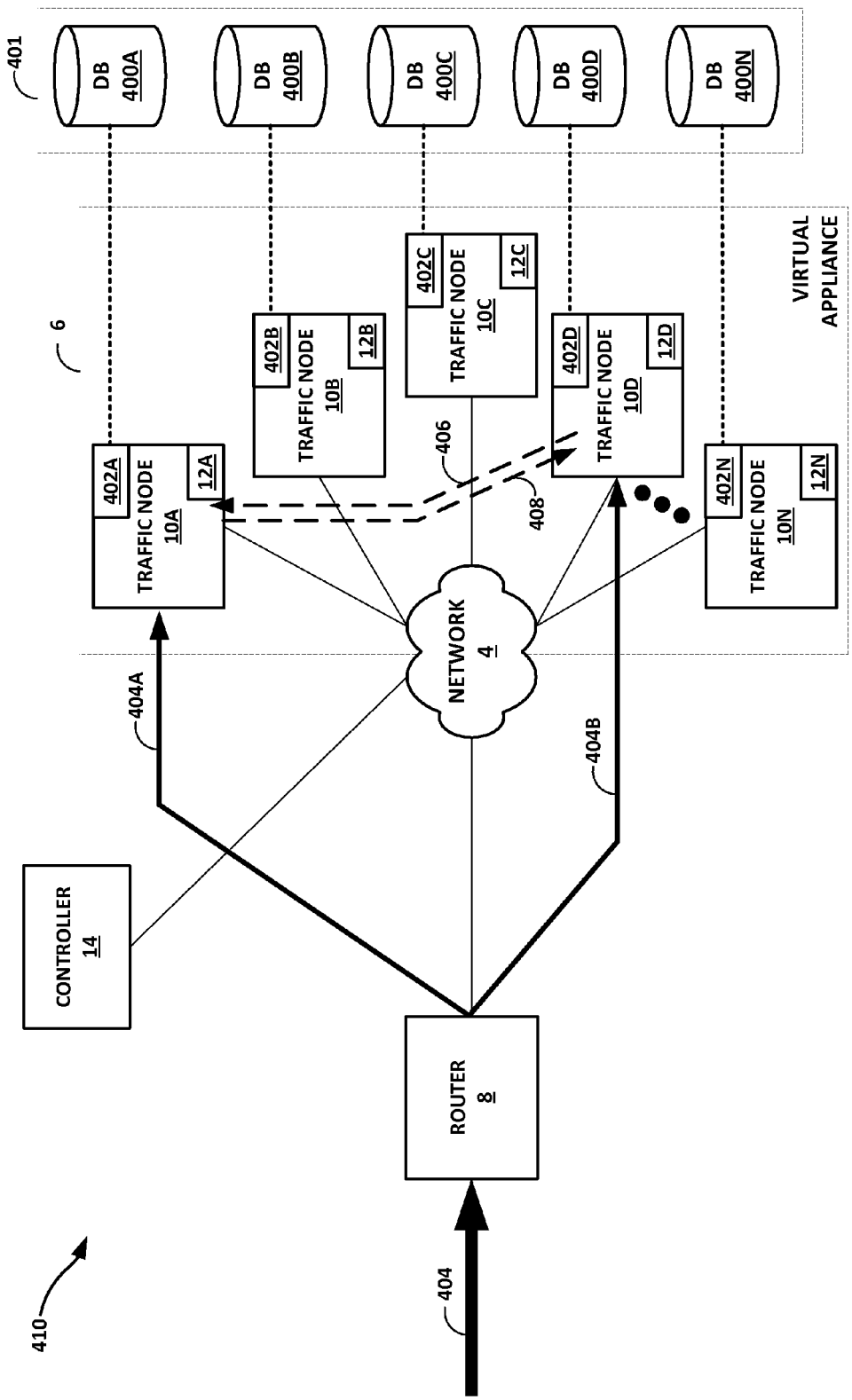
FIG. 9 is a block diagram illustrating a network system in which multiple traffic nodes implement a distributed database for packet flow correlation according to techniques described herein.

FIG. 9 is a block diagram illustrating a network system 410 in which multiple traffic nodes 10 implement a distributed database 401 for packet flow correlation according to techniques described herein. In some deployments of traffic nodes

10, router 8 that load balances packet flows 404 among the traffic nodes 10 interfaces with a system that has an outbound interface to router 8 that originates packet flows 404 for multiple different user session that consequently have the network address (e.g., IPv4 address) of the outbound interface. Examples include a RADIUS/Diameter load balancer, SNAT (e.g., secure/stateful/source/static NAT), and so forth. As described above, traffic nodes 10 using FDTs 12 may apply a hash function for flow distribution that is based on an n-tuple of packet flows 404 rather than based solely on the source address of the packet flows 404. Any of traffic nodes 10 may own the different flow keys for and therefore anchor corresponding packet flows 404 that have the same source network address.

Controller 14 and traffic nodes 10 may distribute multiple flows associated with the same user to different traffic nodes 10 for application of the virtual appliance 6 service, i.e., different traffic nodes 10 own the different key ranges that match the different n-tuple-based flow keys for the multiple flows. For example, some application layer protocols use dynamic ephemeral ports for connections. These may include File Transfer Protocol (FTP), Session Initiation Protocol (SIP), Real-Time Streaming Protocol (RTSP), BitTorrent, etc. For any of these applications, the packet flows 404 for the control and data channels may be processed by different traffic nodes 10. Traffic nodes 10 may, however, need to correlate information for the various packet flows 404 associated with the same user session in order to, e.g., set up a firewall policy to allow a connection initiated by a server for the application. As another example, for application of security services, traffic nodes 10 may process all packet flows 404 originating from a particular source network address to monitor behavior or detect Denial of Service (DoS) or Distributes DoS (DDoS) attacks. Traffic nodes 10 applying FDTs 12, however, may distribute such packet flows 404 according to a flow key based on the n-tuple of the packet flows 404 and not (merely) on the source network address. To properly apply the security service, multiple traffic nodes 10 may correlate the packet flows originating from the particular source network address.

User sessions having packet flows 404 processed by traffic nodes 10 may be uniquely identifiable according to a session key defined by common elements of the packet flows 404, with such elements varying according to the application and/or transport protocol(s) that transports packet flows 404 to traffic nodes 10 from router 8. For example, a RADIUS user session may be identified according to a session key defined by a RADIUS session identifier, an FTP session by a combination of source and destination network addresses, SIP sessions by a combination of source and destination network addresses, mobility service sessions by a tunnel endpoint identifier (TEID) for a mobility tunneling protocol such as GTP, and so forth.

Traffic nodes 10 implement a distributed database 401 by storing data for and managing respective distributed database parts 400A-400N (collectively, "database parts 400") that store packet flow correlation information for user and/or application sessions for a particular protocol. Each database part of database parts 400 represents a different portion of data stored and managed by distributed database 401 and all data represented by the database part is owned by a corresponding "rendezvous" or "designated" traffic node 10 for the data therein. For example, traffic node 10D is a designated traffic node 10 for all data stored by database part 400D. Traffic nodes 10 may store database parts 400 to respective storage devices associated with corresponding traffic nodes 10, such as one or more hard drives or other non-volatile memory, random access memory (RAM) or other volatile memory, file/database servers, or any combination of the above. Traffic nodes 10 may execute database management system instances to implement database parts 400.

As noted above, a designated traffic node 10 owns data usable for correlating session data for packet flows 404 (i.e., "correlation information") that is stored to the corresponding one of database parts 400 for the designated traffic node 10. In other words, correlation information for a given session is associated with one of the traffic nodes 10 that is a designated traffic node 10 for the session, and the correlation information may refer to any information, usable for applying a service to a session, that may be received by any of traffic nodes 10 in packet flows 404 associated with the session and that is then stored by a database part 400 for the designated traffic node 10. A storage location of correlation information is identifiable using database distribution tables (DDTs) 402A-402N (collectively, "DDTs 402") that enable traffic nodes 10 to implement a lookup scheme similar to that described above with respect to FDTs 12. Each entry of DDTs 402 associates a session key range with one of traffic nodes 10 that is the designated traffic node 10 for the session key range. Session key ranges are thus analogous to the flow key ranges described above, and designated traffic nodes 10 for session key ranges are analogous to owner traffic nodes 10 for flow key ranges as also described above.

The session key range is a range within a session key space defined by the range of hash values for a hash function applied by traffic nodes 10 to the session keys for packet flows 404. The size of the session key space may be configurable on traffic nodes 10. Like flow key ranges, session key ranges may be associated with a mask that permits session key ranges to be expressed as prefixes or, more specifically, "session key prefixes." Each of traffic nodes 10 may own zero or more session key ranges/prefixes for the session key space.

Controller 14 initially distributes the session key ranges in a manner analogous to the initial distribution of flow key ranges as described above. Moreover, traffic nodes 10 may migrate session key ranges or perform any other operation described above with respect to flow key ranges.

Any of traffic nodes 10 may use its corresponding DDT 402 to query distributed database 401 to read, update, delete, or other manipulate distribute database 400 records that store correlation information for packet flows 404. For example, traffic node 10D that receives packet flow 404B from router 8 applies the hash function to the session key for packet flow 404B (e.g., a combination of the source/destination network address for a SIP-related packet flow) to obtain a session key hash value. To query distributed database 401 for or with correlation information for the packet flow 404B session, traffic node 10D matches the session key value to a DDT 402 entry having the session key range that includes the session key value (e.g., the narrow such range as described above with respect to flow key matching). The matching DDT 402 entry specifies traffic node 10A as the designated traffic node 10 that stores, to distributed database part 400A, correlation information for sessions having session keys that match the session key range of the matching DDT 402, including the correlation information for the packet flow 404B session.

Having determined the designated traffic node 10A for a session for packet flow 404B, traffic node 10D may generate and send to traffic node 10A in query message 406 a database query to obtain, add to, update, delete or otherwise manipulate the correlation information stored to database part 400A associated with traffic node 10A. In the case of obtaining correlation information (or to confirm a modification operation), designated traffic node 10A returns query response message 408 that may include at least a portion of the correlation information usable by traffic node 10D to apply the service to packet flow 404B.

In some examples, network system 410 may include multiple different distributed databases similar to distributed database 401 for applying different services or applications. The multiple distributed databases may represent data structures managed by a database management system instances executed by traffic nodes 10 or servers or other devices that host database parts 400A-400N.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

In addition to or as an alternative to the above, the following embodiments are described. The features described in any of the following embodiments may be utilized with any of the other embodiments described herein.

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

In one embodiment, a source traffic node operates as a source traffic node of a plurality of traffic nodes that are configured as a distributed computing system to apply a service to packet flows received by any of the plurality of traffic nodes. The traffic node stores a flow distribution table comprising a plurality of flow distribution table entries that each associates a corresponding flow key range from a plurality of flow key ranges with an owner traffic node of the plurality of traffic nodes for the corresponding flow key range, wherein each of the plurality of flow key ranges comprises a contiguous range of flow key values, wherein an existing flow distribution table entry of the flow distribution table entries associates an existing flow key range with the source traffic node. A distribution manager of the traffic node is configured to generate a new flow distribution table entry that associates a new flow key range with a target traffic node of the plurality of traffic nodes, wherein the new flow key range is a sub-range of the existing flow key range. A flow router of the traffic node is configured to receive an initial packet of a packet flow from the packet flows, matching the initial packet to the new flow key range of the new flow distribution table entry, and forwarding the initial packet of the packet flow to the target traffic node based at least on the new flow distribution table entry that associates the new flow key range with the target traffic node.

In some embodiments, the packet flow is a first packet flow, and the flow router, prior to generating the new flow distribution table entry, is further configured to receive an initial packet of a second packet flow, match the initial packet of the second packet flow to the existing flow key range of the existing flow distribution table entry, and apply the service to the initial packet based at least on the existing flow distribution table entry, wherein packets of the second packet flow match both the existing flow key range and the new flow key range. The distribution manager is further configured to generate, for an exact match table, an exact match table entry that associates the second packet flow with the source traffic node. The flow router is further configured to, subsequent to generating the new flow distribution table entry, receive a subsequent packet of a second packet flow and apply the service to the subsequent packet of the second packet flow based at least on the exact match table entry instead of sending the subsequent packet of the second packet flow according to the new flow distribution table entry.

In some embodiments, the flow router is configured to match a packet to a flow key range of the plurality of flow key ranges by applying a hash function to the packet to compute a hash value that represents a flow key for the packet and determining the flow key for packet is within the flow key range.

In some embodiments, each flow key range of the plurality of flow key ranges comprises a prefix and is associated with a mask that defines a prefix size for the flow key range.

In some embodiments, the flow router is further configured to, prior to generating the new flow distribution table entry, receive an initial packet of a second packet flow, match the initial packet of the second packet flow to the existing flow key range of the existing flow distribution table entry, and apply the service to the initial packet based at least on the existing flow distribution table entry, wherein the initial packet of the second packet flow matches both the existing flow key range and the new flow key range. The flow router is further configured to generate, for an exact match table, an exact match table entry that associates the second packet flow with the source traffic node. The distribution manager is further configured to send the exact match table entry to the target traffic node to cause the target traffic node to send packets for the second packet flow to the source traffic node. The flow router is further configured to receive a subsequent packet for the second packet flow from the target traffic node and applying the service to the subsequent packet for the second packet flow based at least on the exact match table entry.

In some embodiments, the flow router is further configured to detect the second packet flow has terminated. The distribution manager is further configured to, in response to detecting the second packet flow has terminated, send a delete exact match table entry message to the target traffic node to cause the target traffic node to delete the exact match table entry.

In some embodiments, the distribution manager is further configured to send, to the target traffic node, a range migration request specifying the new flow key range, wherein the range migration request requests the target traffic node to be the owner traffic node for the new flow key range, wherein generating the new flow distribution table entry comprises generating the new flow distribution table entry only after receiving, from the target traffic node, a range migration accept message. The flow router is further configured to, after sending the range migration request and prior to receiving the range migration accept message, receive a packet of a second packet flow of the plurality of packet flows, match the packet of the second flow to the existing flow key range, and apply the service to the packet of the second packet flow based at least on the flow distribution table entry that associates the existing flow key range with the source traffic node, wherein the packet of the second packet flow also matches the new flow key range.

In some embodiments, the flow router is further configured to send the range migration request by sending the range migration request to a controller for the plurality of traffic nodes to relay the range migration request to the target traffic node via the controller.

In some embodiments, the distribution manager is further configured to receive a rebalance notification message from a controller for the plurality of traffic nodes, wherein the rebalance notification directs the source traffic node to migrate at least one flow key range owned by the source traffic node. The distribution manager is further configured to, in response to the rebalance notification, select the new flow key range for migration, wherein generating the new flow distribution table entry comprises generating the new flow distribution table entry upon selecting the new flow key range for migration.

In some embodiments, the source traffic node is one or a virtual machine and a real server.

In some embodiments, the distribution manager is further configured to send range migration update message to a controller for the plurality of traffic nodes, wherein the range migration update message indicates the source traffic node is ready to migrate the new flow key range to the target traffic node, and the range migration update message causes the controller to send a range migration broadcast message to at least one of the plurality of traffic nodes, wherein the range migration broadcast message indicates the target traffic node is the owner traffic node of the new flow key range.

In some embodiments, the distribution manager is further configured to receive the range migration broadcast message from the controller and store the new flow distribution table entry to the flow distribution table only after receiving the range migration broadcast message, wherein the flow router forwards the initial packet of the packet flow to the target traffic node based at least on the new flow distribution table entry by matching the initial packet to the new flow key range of the new flow distribution table entry stored to the flow distribution table.

In some embodiments, the source traffic node stores a database distribution table comprising a plurality of database distribution table entries that each associates a corresponding session key range of a plurality of session key ranges with a designated traffic node from the plurality of traffic nodes for the corresponding session key range, wherein each of the plurality of session key ranges comprises a contiguous range of session key values within a session key value space, wherein each of the session key values identifies a session to which the plurality of traffic nodes apply a service. For each database distribution table entry from the plurality of database distribution table entries, the designated traffic node associated in the database distribution table entry with the corresponding session key range stores a distributed database part from a plurality of distributed database parts of a distributed database, wherein the distributed database part includes all correlation information that is stored by the distributed database for sessions identified by session key values that are within the corresponding session key range.

In some embodiments, the packet flow is a first packet flow and the flow router is further configured to receive an initial packet of a second packet flow, determine a session key value for a session associated with the second packet flow, determine using the database distribution table a designated traffic node for the session key value, query the designated traffic node for the session key value to obtain correlation information for the session associated with the second packet flow. A service application of the source traffic node is configured to apply the service to the initial packet using the correlation information for the session associated with the second packet flow.

In some embodiments, prior to the distribution manager generating the new flow distribution table entry, the flow router is further configured to receive an initial packet of a second packet flow, match the initial packet of the second packet flow to the existing flow key range of the existing flow distribution table entry, and apply the service to the initial packet based at least on the existing flow distribution table entry, wherein the initial packet of the second packet flow matches both the existing flow key range and the new flow key range. The flow router is further configured to add the second packet flow to a flow table of the source traffic node and associate the new flow key range with a migrating out indication.

In some embodiments, the flow router is further configured to receive a subsequent packet of the second packet flow. The flow router is further configured to match the subsequent packet to the new flow key range of the new flow distribution table entry and, in response to determining the new flow key range is associated with a migrating out indication, determine whether the flow table includes the second packet flow. A service application is configured to, in response to determining the flow table includes the second packet flow, apply the service to the subsequent packet.

In some embodiments, subsequent to associating the new flow key range with a migrating out indication, a flow router is further configured to receive an initial packet of a third packet flow, match the initial packet to the new flow key range of the new flow distribution table entry, and in response to determining the new flow key range is associated with a migrating out indication, determine whether the flow table includes the third packet flow. The flow router is further configured to, in response to determining the flow table does not include the third packet flow, forward the initial packet to the target traffic node based at least on the new flow distribution table entry.

In another embodiment, a controller device for a plurality of traffic nodes that are configured as a distributed computing system to apply a service to packet flows received by any of the plurality of traffic nodes includes a processor configured to receive a resource utilization report from a source traffic node of the plurality of traffic nodes, wherein the source traffic node of the plurality of traffic nodes stores a flow distribution table comprising a plurality of flow distribution table entries that each associates a corresponding flow key range of a plurality of flow key ranges with an owner traffic node of the plurality of traffic nodes for the corresponding flow key range, wherein each of the plurality of flow key ranges comprises a contiguous range of flow key values. The processor is further configured to send, in response to the resource utilization report and to the source traffic node, a rebalance notification message that directs source traffic node to migrate at least one flow key range of the plurality of flow key ranges. The processor is further configured to receive, from the source traffic node, a range migration update message that indicates the source traffic node is ready to migrate ownership of a flow key range for migration to a target traffic node of the plurality of traffic nodes. The processor is further configured to broadcast, to the plurality of traffic nodes, a range migration broadcast message that indicates the target traffic node is an owner traffic node of the flow key range for migration.

In some examples, the processor is further configured to receive, from the source traffic node, a range migration request message requesting the target traffic node of the plurality of traffic nodes to be the owner traffic node for the flow key range for migration. The processor is further configured to send, to the target traffic node, the range migration request message.

In some examples, the processor is further configured to receive, from the target traffic node, a range migration accept message accepting ownership of the flow key range for migration. The processor is further configured to send, to the source traffic node, the range migration accept message.

In some examples, the controller comprises an active controller, and the processor is further configured to send, by the active controller to a backup controller for the active controller, a representation of a state of a migration process for the flow key range for migration, wherein the representation includes the range migration request message.

In some embodiments, a computing device includes means for storing, by a source traffic node of a plurality of traffic nodes that are configured as a distributed computing system to apply a service to packet flows received by any of the plurality of traffic nodes, a flow distribution table comprising a plurality of flow distribution table entries that each associates a corresponding flow key range from a plurality of flow key ranges with an owner traffic node of the plurality of traffic nodes for the corresponding flow key range, wherein each of the plurality of flow key ranges comprises a contiguous range of flow key values, wherein an existing flow distribution table entry of the flow distribution table entries associates an existing flow key range with the source traffic node. The computing device also includes means for generating, by the source traffic node, a new flow distribution table entry that associates a new flow key range with a target traffic node of the plurality of traffic nodes, wherein the new flow key range is a sub-range of the existing flow key range. The computing device also includes means for receiving, by the source traffic node, an initial packet of a packet flow of the packet flows, matching the initial packet to the new flow key range of the new flow distribution table entry, and forwarding the initial packet of the packet flow to the target traffic node based at least on the new flow distribution table entry that associates the new flow key range with the target traffic node.

Various embodiments have been described. These and other embodiments are within the scope of the following examples.

What is claimed is:

1. A method comprising:
storing, by a source traffic node of a plurality of traffic nodes that are configured as a distributed computing system to apply a service to packet flows received by any of the plurality of traffic nodes, a flow distribution table comprising a plurality of flow distribution table entries that each associates a corresponding flow key range from a plurality of flow key ranges with an owner traffic node of the plurality of traffic nodes for the corresponding flow key range, wherein each of the plurality of flow key ranges comprises a contiguous range of flow key values,
wherein an existing flow distribution table entry of the flow distribution table entries associates an existing flow key range with the source traffic node;
generating, by the source traffic node, a new flow distribution table entry that associates a new flow key range with a target traffic node of the plurality of traffic nodes, wherein the new flow key range is a sub-range of the existing flow key range; and
receiving, by the source traffic node, an initial packet of a packet flow of the packet flows, matching the initial packet to the new flow key range of the new flow distribution table entry, and forwarding the initial packet of the packet flow to the target traffic node based at least on the new flow distribution table entry that associates the new flow key range with the target traffic node.

2. The method of claim 1, wherein the packet flow is a first packet flow, the method further comprising:
by the source traffic node and prior to generating the new flow distribution table entry, receiving an initial packet of a second packet flow, matching the initial packet of the second packet flow to the existing flow key range of the existing flow distribution table entry, and applying the service to the initial packet based at least on the existing flow distribution table entry,
wherein packets of the second packet flow match both the existing flow key range and the new flow key range;
generating, by the source traffic node and for an exact match table, an exact match table entry that associates the second packet flow with the source traffic node; and
by the source traffic node and subsequent to generating the new flow distribution table entry, receiving a subsequent packet of a second packet flow and applying the service to the subsequent packet of the second packet flow based at least on the exact match table entry instead of sending the subsequent packet of the second packet flow according to the new flow distribution table entry.

3. The method of claim 1, wherein matching a packet to a flow key range of the plurality of flow key ranges comprises:
applying a hash function to the packet to compute a hash value that represents a flow key for the packet; and
determining the flow key for packet is within the flow key range.

4. The method of claim 3, wherein each flow key range of the plurality of flow key ranges comprises a prefix and is associated with a mask that defines a prefix size for the flow key range.

5. The method of claim 1, further comprising:
by the source traffic node and prior to generating the new flow distribution table entry, receiving an initial packet of a second packet flow, matching the initial packet of the second packet flow to the existing flow key range of the existing flow distribution table entry, and applying the service to the initial packet based at least on the existing flow distribution table entry, wherein the initial packet of the second packet flow matches both the existing flow key range and the new flow key range;

generating, by the source traffic node and for an exact match table, an exact match table entry that associates the second packet flow with the source traffic node;

sending, by the source traffic node, the exact match table entry to the target traffic node to cause the target traffic node to send packets for the second packet flow to the source traffic node; and receiving, by the source traffic node, a subsequent packet for the second packet flow from the target traffic node and applying the service to the subsequent packet for the second packet flow based at least on the exact match table entry.

6. The method of claim 5, further comprising:

detecting, by the source traffic node, the second packet flow has terminated; and by the source traffic node and in response to detecting the second packet flow has terminated, sending a delete exact match table entry message to the target traffic node to cause the target traffic node to delete the exact match table entry.

7. The method of claim 1, wherein the packet flow is a first packet flow, the method further comprising:

sending, by the source traffic node and to the target traffic node, a range migration request specifying the new flow key range, wherein the range migration request requests the target traffic node to be the owner traffic node for the new flow key range, wherein generating the new flow distribution table entry comprises generating the new flow distribution table entry only after receiving, by the source traffic node and from the target traffic node, a range migration accept message; and by the source traffic node after sending the range migration request and prior to receiving the range migration accept message, receiving a packet of a second packet flow of the plurality of packet flows, matching the packet of the second flow to the existing flow key range, and applying the service to the packet of the second packet flow based at least on the flow distribution table entry that associates the existing flow key range with the source traffic node, wherein the packet of the second packet flow also matches the new flow key range.

8. The method of claim 7, wherein sending the range migration request comprises sending the range migration request to a controller for the plurality of traffic nodes to relay the range migration request to the target traffic node via the controller.

9. The method of claim 1, further comprising:

receiving, by the source traffic node, a rebalance notification message from a controller for the plurality of traffic nodes, wherein the rebalance notification directs the source traffic node to migrate at least one flow key range owned by the source traffic node; and by the source traffic node and in response to the rebalance notification, selecting the new flow key range for migration, wherein generating the new flow distribution table entry comprises generating the new flow distribution table entry upon selecting the new flow key range for migration.

10. The method of claim 1, wherein each of the plurality of traffic nodes comprises one of a virtual machine and a real server.

11. The method of claim 1, further comprising:

sending, by the source traffic, a range migration update message to a controller for the plurality of traffic nodes, wherein the range migration update message indicates the source traffic node is ready to migrate the new flow key range to the target traffic node, and wherein the range migration update message causes the controller to send a range migration broadcast message to at least one of the plurality of traffic nodes, wherein the range migration broadcast message indicates the target traffic node is the owner traffic node of the new flow key range.

12. The method of claim 11, receiving, by the source traffic node, the range migration broadcast message from the controller; and storing, by the source traffic node, the new flow distribution table entry to the flow distribution table only after receiving the range migration broadcast message, wherein forwarding the initial packet of the packet flow to the target traffic node based at least on the new flow distribution table entry comprises matching the initial packet to the new flow key range of the new flow distribution table entry stored to the flow distribution table.

13. The method of claim 1, further comprising:

storing, by the source traffic node, a database distribution table comprising a plurality of database distribution table entries that each associates a corresponding session key range of a plurality of session key ranges with a designated traffic node from the plurality of traffic nodes for the corresponding session key range, wherein each of the plurality of session key ranges comprises a contiguous range of session key values within a session key value space, wherein each of the session key values identifies a session to which the plurality of traffic nodes apply a service; and for each database distribution table entry from the plurality of database distribution table entries and by the designated traffic node associated in the database distribution table entry with the corresponding session key range, storing a distributed database part from a plurality of distributed database parts of a distributed database, wherein the distributed database part includes all correlation information that is stored by the distributed database for sessions identified by session key values that are within the corresponding session key range.

14. The method of claim 13, wherein the packet flow is a first packet flow, the method further comprising:

by the source traffic node, receiving an initial packet of a second packet flow;

determining, by the source traffic node, a session key value for a session associated with the second packet flow;

determining, by the source traffic node using the database distribution table, a designated traffic node for the session key value;

querying, by the source traffic node, the designated traffic node for the session key value to obtain correlation information for the session associated with the second packet flow; and applying, by the source traffic node, the service to the initial packet using the correlation information for the session associated with the second packet flow.

15. The method of claim 1, further comprising:

by the source traffic node and prior to generating the new flow distribution table entry, receiving an initial packet of a second packet flow, matching the initial packet of the second packet flow to the existing flow key range of the existing flow distribution table entry, and applying the service to the initial packet based at least on the existing flow distribution table entry, wherein the initial packet of the second packet flow matches both the existing flow key range and the new flow key range;

adding the second packet flow to a flow table of the source traffic node; and associating the new flow key range with a migrating out indication.

16. The method of claim 15, further comprising:
receiving, by the source traffic node, a subsequent packet of the second packet flow;

matching, by the source traffic node, the subsequent packet to the new flow key range of the new flow distribution table entry;

by the source traffic node and in response to determining the new flow key range is associated with a migrating out indication, determining whether the flow table includes the second packet flow; and by the source traffic node and in response to determining the flow table includes the second packet flow, applying the service to the subsequent packet.

17. The method of claim 15, further comprising:
by the source traffic node and subsequent to associating the new flow key range with a migrating out indication, receiving an initial packet of a third packet flow;

matching, by the source traffic node, the initial packet to the new flow key range of the new flow distribution table entry;

by the source traffic node and in response to determining the new flow key range is associated with a migrating out indication, determining whether the flow table includes the third packet flow; and by the source traffic node and in response to determining the flow table does not include the third packet flow, forwarding the initial packet to the target traffic node based at least on the new flow distribution table entry.

18. A method comprising:
by a controller for a plurality of traffic nodes that are configured as a distributed computing system to apply a service to packet flows received by any of the plurality of traffic nodes, receiving a resource utilization report from a source traffic node of the plurality of traffic nodes, wherein the source traffic node of the plurality of traffic nodes stores a flow distribution table comprising a plurality of flow distribution table entries that each associates a corresponding flow key range of a plurality of flow key ranges with an owner traffic node of the plurality of traffic nodes for the corresponding flow key range, wherein each of the plurality of flow key ranges comprises a contiguous range of flow key values;

sending, by the controller in response to the resource utilization report and to the source traffic node, a rebalance notification message that directs source traffic node to migrate at least one flow key range of the plurality of flow key ranges;

receiving, by the controller from the source traffic node, a range migration update message that indicates the source traffic node is ready to migrate ownership of a flow key range for migration to a target traffic node of the plurality of traffic nodes; and broadcasting, by the controller to the plurality of traffic nodes, a range migration broadcast message that indicates the target traffic node is an owner traffic node of the flow key range for migration.

19. The method of claim 18, further comprising:
receiving, by the controller and from the source traffic node, a range migration request message requesting the target traffic node of the plurality of traffic nodes to be the owner traffic node for the flow key range for migration; and sending, by the controller and to the target traffic node, the range migration request message.

20. The method of claim 19, further comprising:
receiving, by the controller and from the target traffic node, a range migration accept message accepting ownership of the flow key range for migration; and sending, by the controller and to the source traffic node, the range migration accept message.

21. The method of claim 19, wherein the controller comprises an active controller, the method further comprising:
sending, by the active controller to a backup controller for the active controller, a representation of a state of a migration process for the flow key range for migration, wherein the representation includes the range migration request message.

22. A system comprising:
a plurality of traffic nodes that are configured as a distributed computing system to apply a service to packet flows received by any of the plurality of traffic nodes, wherein the plurality of traffic nodes includes a source traffic node and a target traffic node, wherein the source traffic node comprises:

a control unit comprising a processor;

a computer-readable storage medium configured to store a flow distribution table comprising a plurality of flow distribution table entries that each associates a corresponding flow key range from a plurality of flow key ranges with an owner traffic node of the plurality of traffic nodes for the corresponding flow key range, wherein each of the plurality of flow key ranges comprises a contiguous range of flow key values, wherein an existing flow distribution table entry of the flow distribution table entries associates an existing flow key range with the source traffic node;

a distribution manager executed by the control unit and configured to generate a new flow distribution table entry that associates a new flow key range with the target traffic node, wherein the new flow key range is a subrange of the existing flow key range; and a flow router executed by the control unit and configured to receive an initial packet of a packet flow from the packet flows, match the initial packet to the new flow key range of the new flow distribution table entry, and forward the initial packet of the packet flow to the target traffic node based at least on the new flow distribution table entry that associates the new flow key range with the target traffic node.

23. A controller device for a plurality of traffic nodes that are configured as a distributed computing system to apply a service to packet flows received by any of the plurality of traffic nodes, the controller device comprising:

a processor configured to:

receive a resource utilization report from a source traffic node of the plurality of traffic nodes, wherein the source traffic node of the plurality of traffic nodes stores a flow distribution table comprising a plurality of flow distribution table entries that each associates a corresponding flow key range of a plurality of flow key ranges with an owner traffic node of the plurality of traffic nodes for the corresponding flow key range, wherein each of the plurality of flow key ranges comprises a contiguous range of flow key values;

send, in response to the resource utilization report and to the source traffic node, a rebalance notification message that directs source traffic node to migrate at least one flow key range of the plurality of flow key ranges;

receive, from the source traffic node, a range migration update message that indicates the source traffic node is ready to migrate ownership of a flow key range for migration to a target traffic node of the plurality of traffic nodes; and broadcast, to the plurality of traffic nodes, a range migration broadcast message that indicates the target traffic node is an owner traffic node of the flow key range for migration.

* * * * *